United States Patent
Lee et al.

(10) Patent No.: US 11,838,233 B2
(45) Date of Patent: *Dec. 5, 2023

(54) METHOD AND DEVICE FOR PERFORMING SL TRANSMISSION IN NR V2X

(71) Applicant: LG Electronics Inc., Seoul (KR)

(72) Inventors: Seungmin Lee, Seoul (KR); Hanbyul Seo, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,819

(22) Filed: Jan. 11, 2023

(65) Prior Publication Data

US 2023/0144832 A1 May 11, 2023

Related U.S. Application Data

(63) Continuation of application No. 17/773,953, filed as application No. PCT/KR2020/015213 on Nov. 3, 2020.

(60) Provisional application No. 62/938,297, filed on Nov. 20, 2019, provisional application No. 62/933,358, filed on Nov. 8, 2019, provisional application No. 62/933,338, filed on Nov. 8, 2019, provisional application No. 62/929,947, filed on Nov. 3, 2019.

(51) Int. Cl.
*H04L 5/00* (2006.01)
*H04W 72/20* (2023.01)

(52) U.S. Cl.
CPC .......... *H04L 5/0048* (2013.01); *H04W 72/20* (2023.01)

(58) Field of Classification Search
CPC .............................. H04L 5/0048; H04W 72/20
See application file for complete search history.

(56) References Cited

U.S. PATENT DOCUMENTS

| | | |
|---|---|---|
| 2018/0070264 A1 | 3/2018 | Saiwai et al. |
| 2018/0206260 A1 | 7/2018 | Khoryaev et al. |
| 2019/0260466 A1* | 8/2019 | Bai ................ H04B 7/2603 |

(Continued)

FOREIGN PATENT DOCUMENTS

| | | |
|---|---|---|
| EP | 3952191 | 2/2022 |
| WO | WO 2019/051085 | 3/2019 |

OTHER PUBLICATIONS

Extended European Search Report in European Appln. No. 20881021.8, dated Oct. 28, 2022, 10 pages.

(Continued)

*Primary Examiner* — Jasper Kwoh
(74) *Attorney, Agent, or Firm* — Fish & Richardson P.C.

(57) ABSTRACT

A method for performing wireless communication by a first device and a device for supporting same. The method includes: mapping first sidelink control information (SCI) onto a resource related to a physical sidelink control channel (PSCCH); mapping a phase tracking-reference signal (PT-RS) onto a resource related to a physical sidelink shared channel (PSSCH), on the basis of a cyclic redundancy check (CRC) on the PSCCH; mapping second SCI onto a resource onto which the PT-RS is not mapped, among resources related to the PSSCH; and transmitting the first SCI, the second SCI, and the PT-RS to a second device, wherein the second SCI is not mapped onto a resource onto which the PT-RS is mapped.

16 Claims, 28 Drawing Sheets

(56) References Cited

U.S. PATENT DOCUMENTS

| | | | | |
|---|---|---|---|---|
| 2020/0029318 A1* | 1/2020 | Guo | ................... | H04L 1/1822 |
| 2020/0052843 A1* | 2/2020 | Cheng | ................ | H04W 72/20 |
| 2020/0336253 A1* | 10/2020 | He | ..................... | H04W 4/40 |
| 2021/0058207 A1* | 2/2021 | Lee | ................... | H04L 5/0053 |
| 2021/0099265 A1* | 4/2021 | Shin | ............... | H04W 72/0453 |
| 2021/0105119 A1* | 4/2021 | Sarkis | ............... | H04L 5/0033 |
| 2022/0191983 A1* | 6/2022 | Huang | .............. | H04N 19/172 |

OTHER PUBLICATIONS

Huawei & HiSilicon, "Sidelink physical layer structure for NR V2X," R1-1910054, Presented at 3GPP TSG RAN WG1 Meeting #98bis, Chongqing, China, Oct. 14-20, 2019, 35 pages.

LG Electronics, "Discussion on Physical Layer Structure for NR Sidelink," R1-1910777, 3GPP TSG RAN WG1 #98bis, Chongqing, China, Oct. 14-20, 2019, 42 pages.

LG Electronics, "Discussion on Physical Layer Structure for NR Sidelink," R1-1911346, 3GPP TSG RAN WG1 #98bis, Chongqing, China, Oct. 14-20, 2019, 43 pages.

Notice of Allowance in Korean Appln. No. 10-2022-7014998, dated Sep. 30, 2022, 5 pages (with English translation).

Samsung, "On Physical Layer Structures for NR V2X," R1-1910469, 3GPP TSG RAN WG1 #98bis, Meeting, Chongqing, China, Oct. 14-20, 2019, 15 pages.

\* cited by examiner

FIG. 4
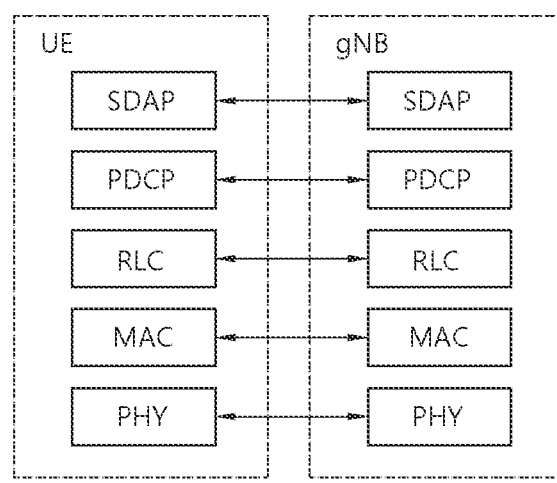
(a)
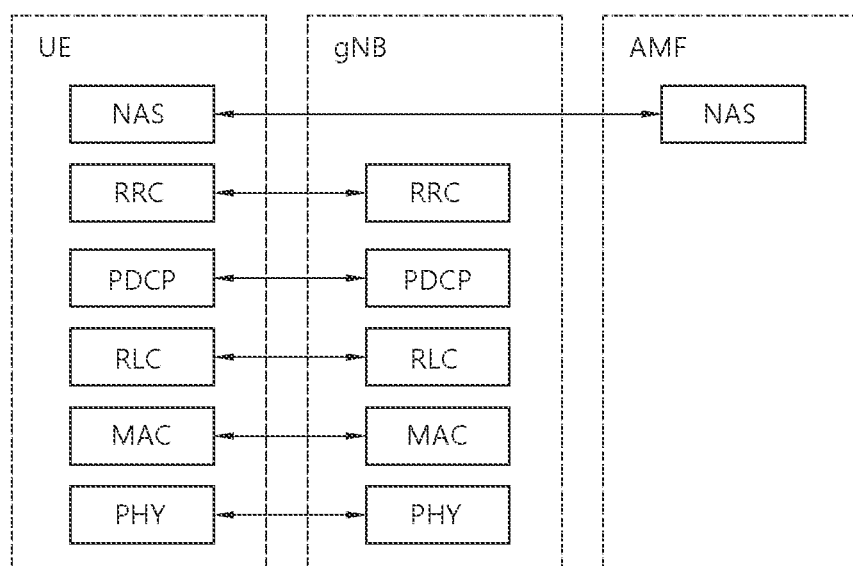
(b)

FIG. 8
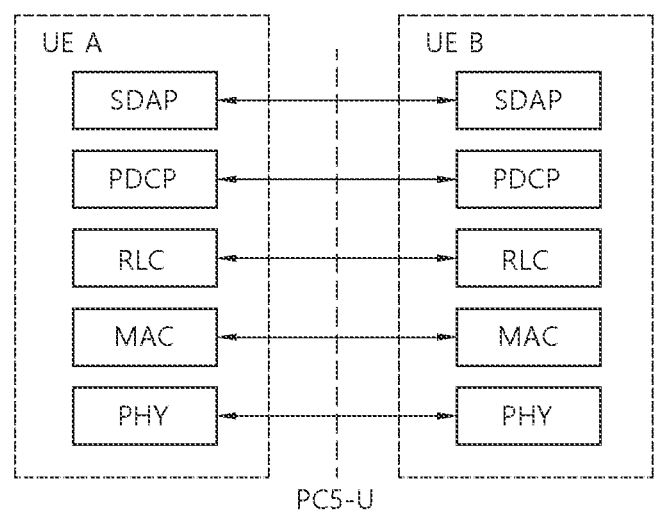
(a)
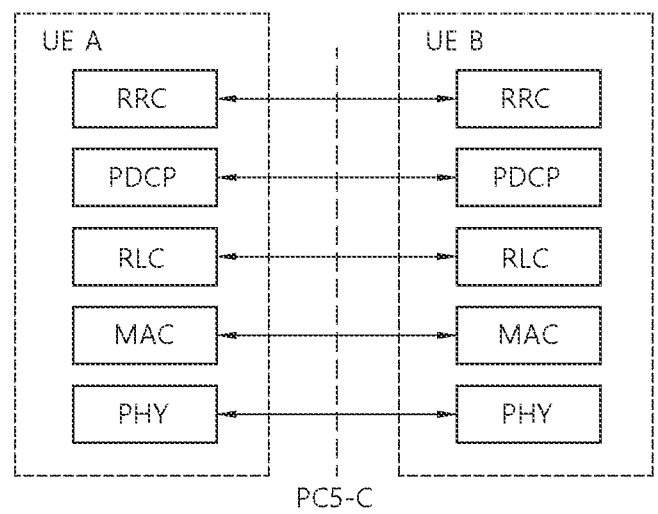
(b)

FIG. 13
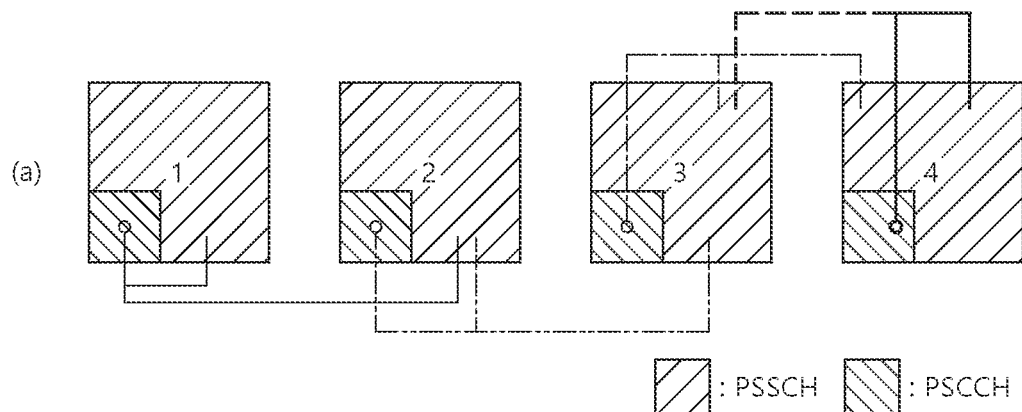
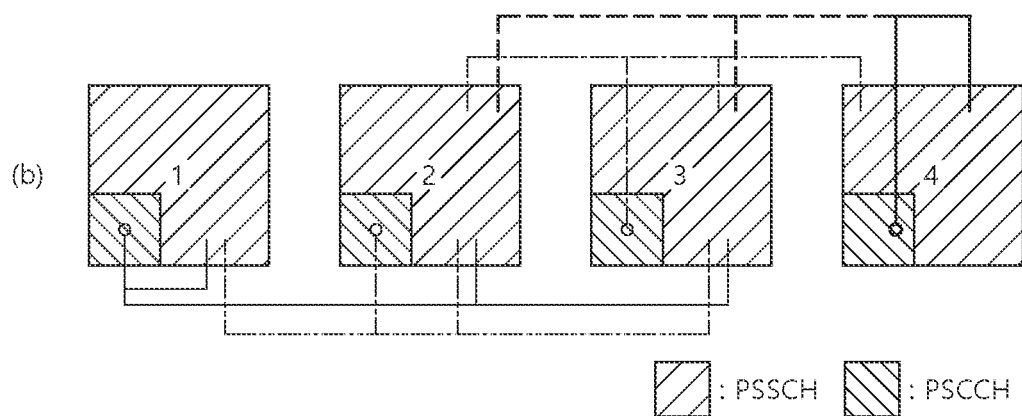
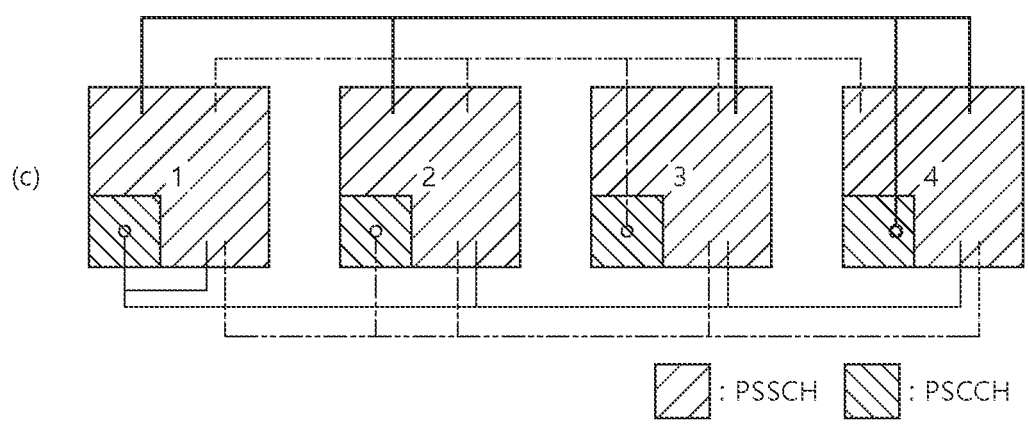

FIG. 22 receive, from first device,
first SCI, second SCI and PT-RS — S2210

METHOD AND DEVICE FOR PERFORMING SL TRANSMISSION IN NR V2X

CROSS-REFERENCE TO RELATED APPLICATIONS

This application is a continuation of U.S. application Ser. No. 17/773,953, filed on May 3, 2022, which is a National Stage application under 35 U.S.C. § 371 of International Application No. PCT/KR2020/015213, filed on Nov. 3, 2020, which claims the benefit of U.S. Provisional Application No. 62/929,947, filed on Nov. 3, 2019, U.S. Provisional Application No. 62/933,338, filed on Nov. 8, 2019, U.S. Provisional Application No. 62/933,358, filed on Nov. 8, 2019, and U.S. Provisional Application No. 62/938,297, filed on Nov. 20, 2019. The disclosures of the prior applications are incorporated by reference in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental. Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in SL communication, the UE needs to transmit a sidelink control information (SCI), a phase tracking-reference signal (PT-RS), a demodulation-reference signal (DM-RS), a channel state information-reference signal (CSI-RS), etc. In this case, it is necessary to propose a method for the UE to efficiently map and transmit the SCI, the PT-RS, the DM-RS, the CSI-RS, etc. to resources and an apparatus supporting the same.

Technical Solutions

In one embodiment, a method for performing, by a first device, wireless communication is provided. The method may comprise: mapping a first sidelink control information (SCI) to a resource related to a physical sidelink control channel (PSCCH); mapping, based on a cyclic redundancy check (CRC) on the PSCCH, a phase tracking-reference signal (PT-RS) to a resource related to a physical sidelink shared channel (PSSCH); mapping a second SCI to a resource to which the PT-RS is not mapped among the resource related to the PSSCH; and transmitting, to a second device, the first SCI, the second SCI, and the PT-RS, wherein the second SCI is not mapped to the resource to which the PT-RS is mapped.

In one embodiment, a first device configured to perform wireless communication is provided. The first device may comprise: one or more memories storing instructions; one or more transceivers; and one or more processors connected to the one or more memories and the one or more transceivers. The one or more processors may execute the instructions to: map a first sidelink control information (SCI) to a resource related to a physical sidelink control channel (PSCCH); map, based on a cyclic redundancy check (CRC) on the PSCCH, a phase tracking-reference signal (PT-RS) to a resource related to a physical sidelink shared channel (PSSCH); map a second SCI to a resource to which the PT-RS is not mapped among the resource related to the PSSCH; and transmit, to a second device, the first SCI, the second SCI, and the PT-RS, wherein the second SCI is not mapped to the resource to which the PT-RS is mapped.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

FIG. 13 shows a method in which a UE that has reserved transmission resource(s) informs another UE of the transmission resource(s), based on an embodiment of the present disclosure.

FIG. 22 shows a method for a second device to perform wireless communication, based on an embodiment of the present disclosure.

DESCRIPTION OF EXEMPLARY EMBODIMENTS

Figure 1:
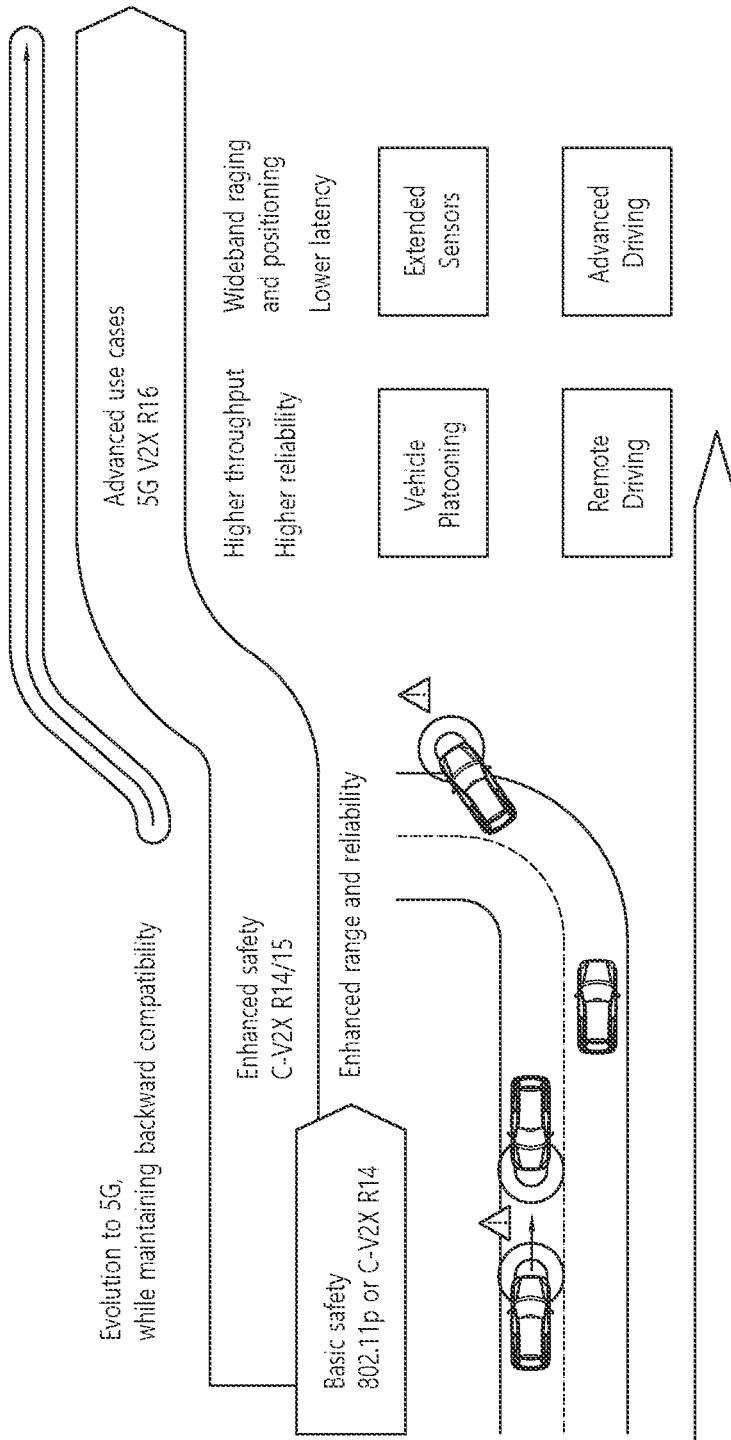
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
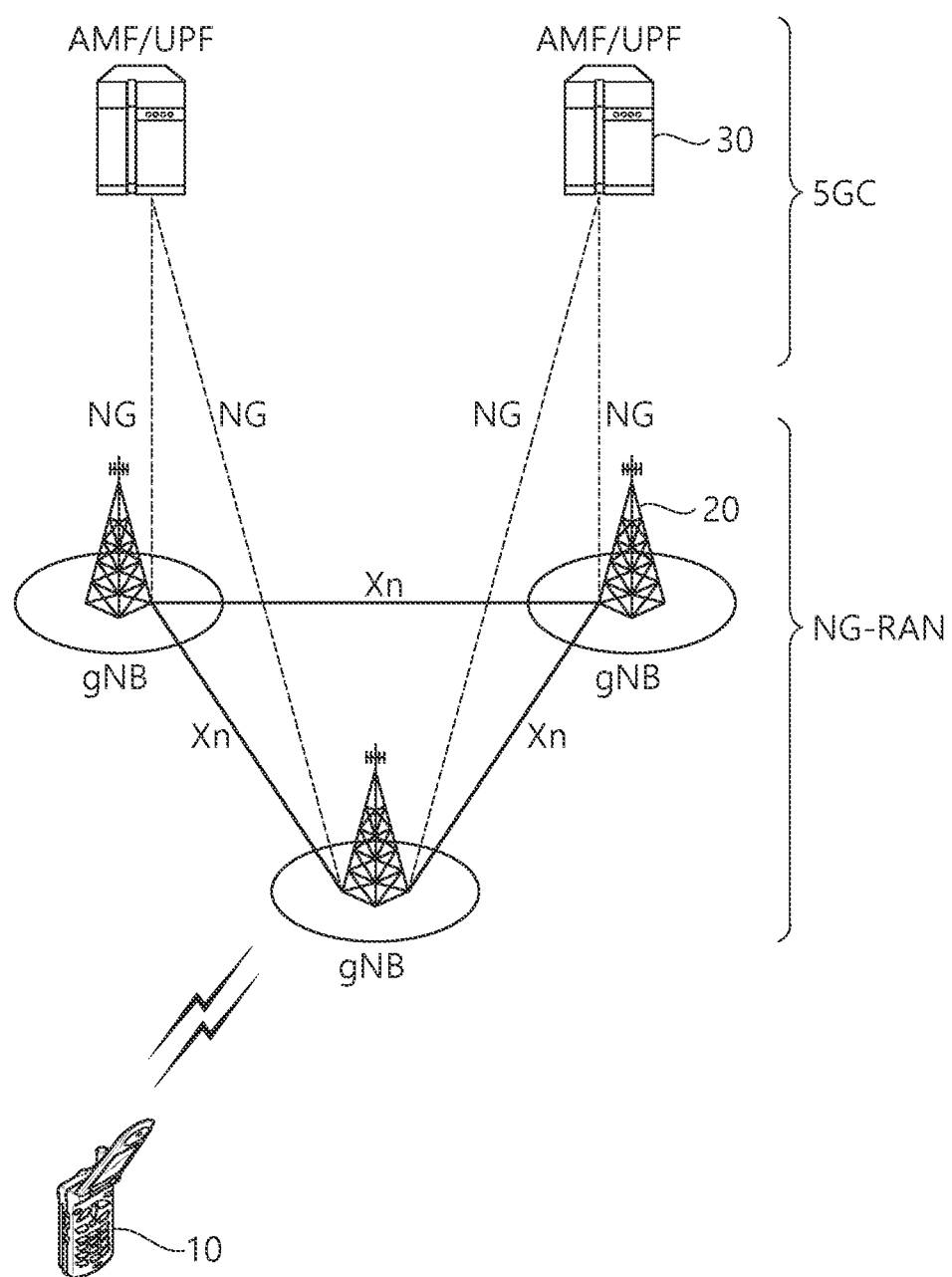
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
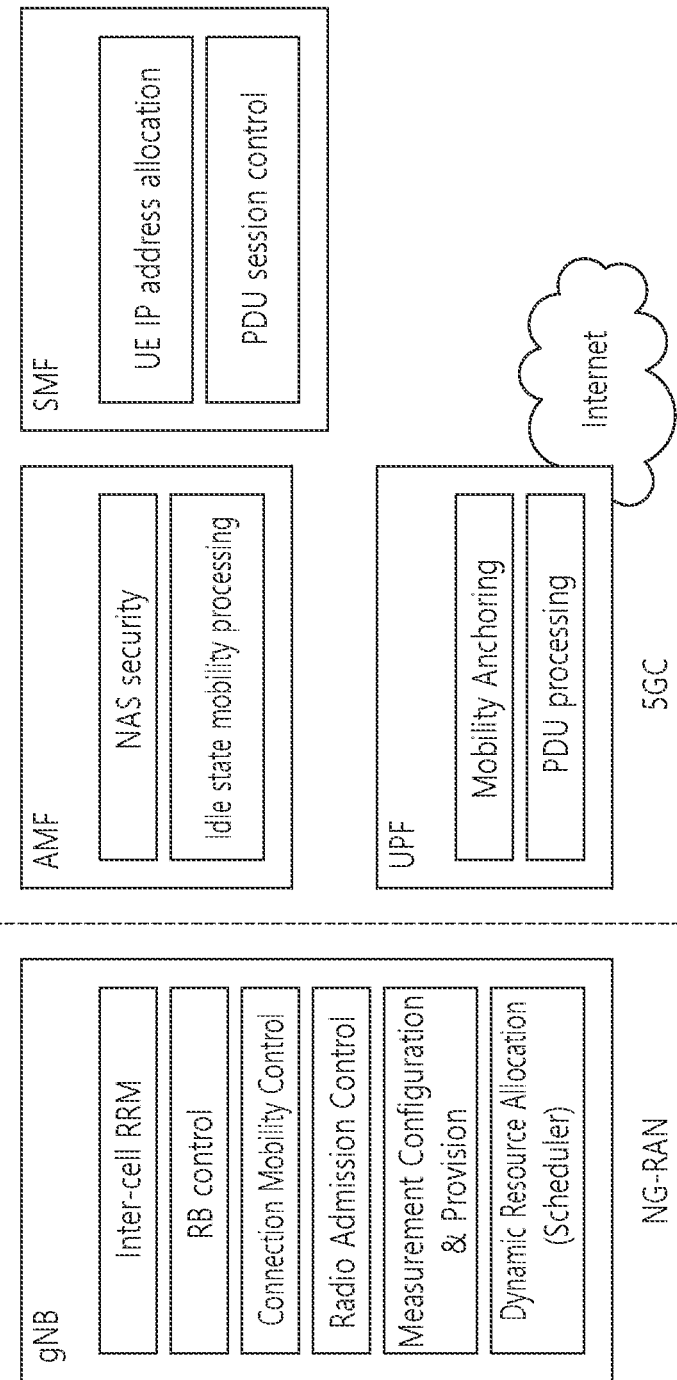
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physic al layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
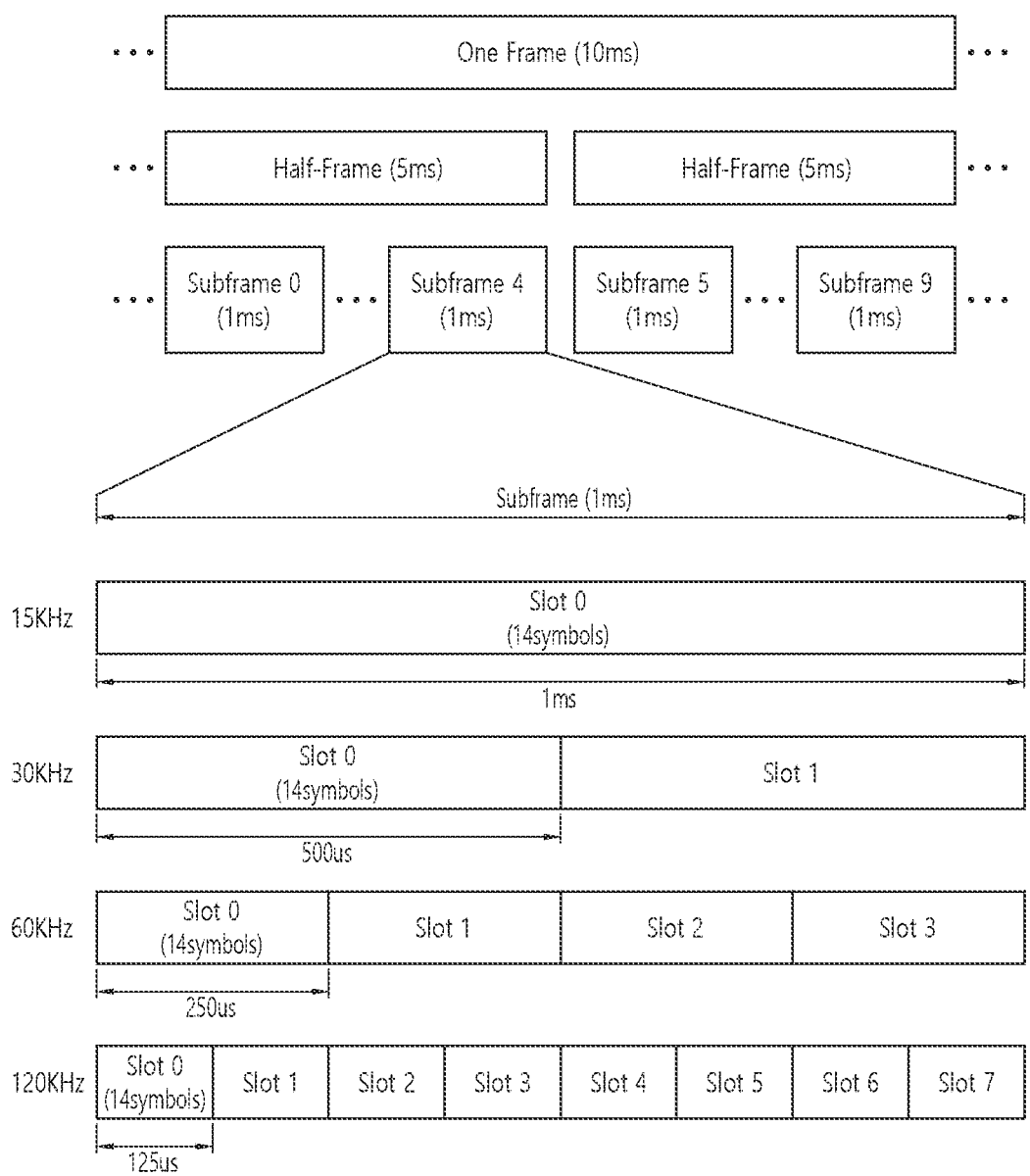
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
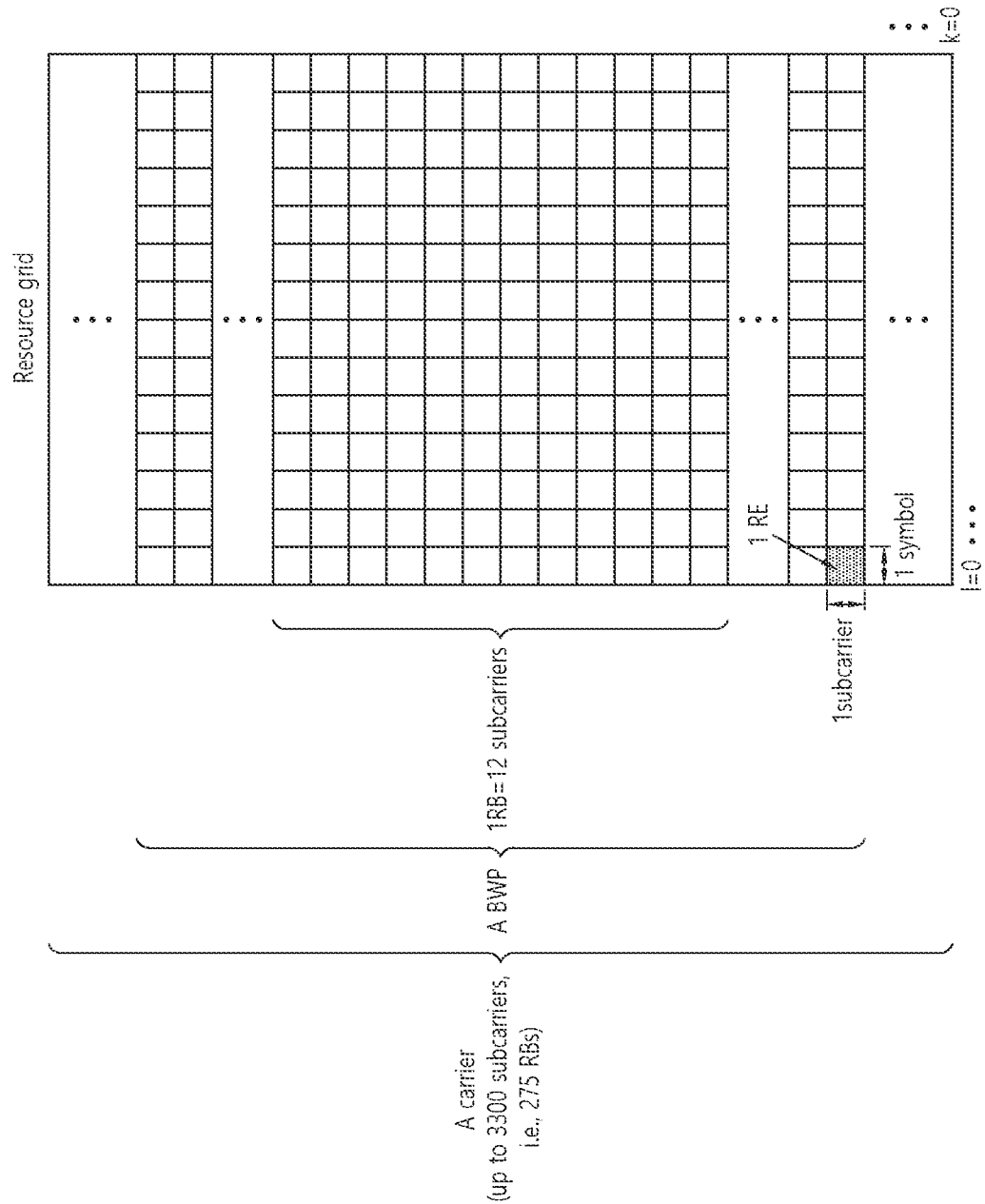
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
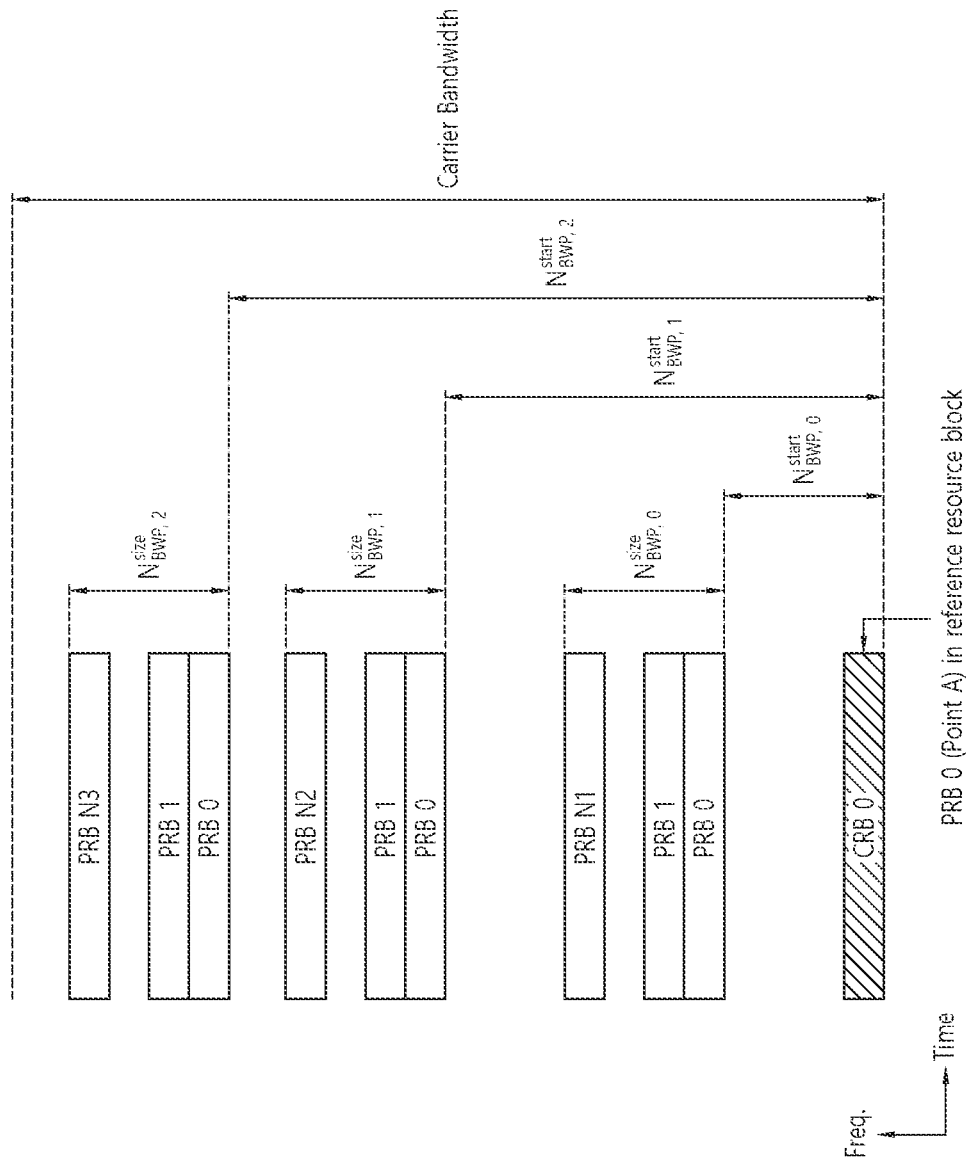
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
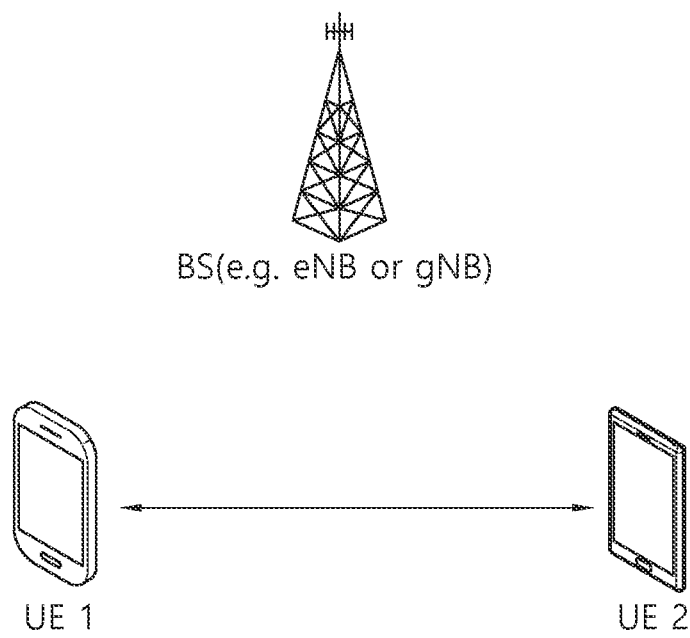
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
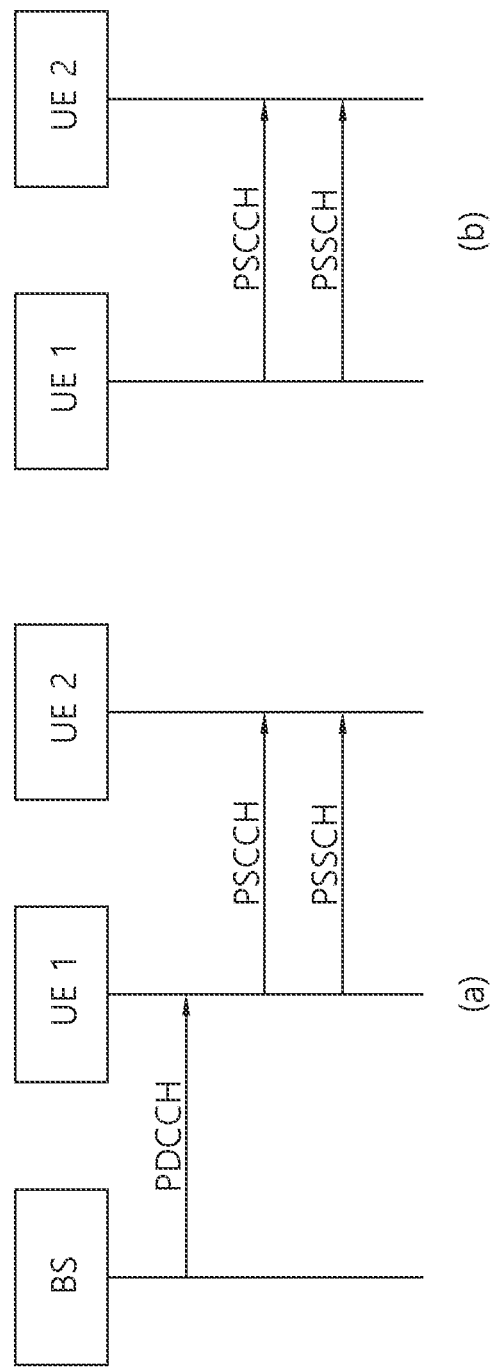
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule a SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine a SL transmission resource within a SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
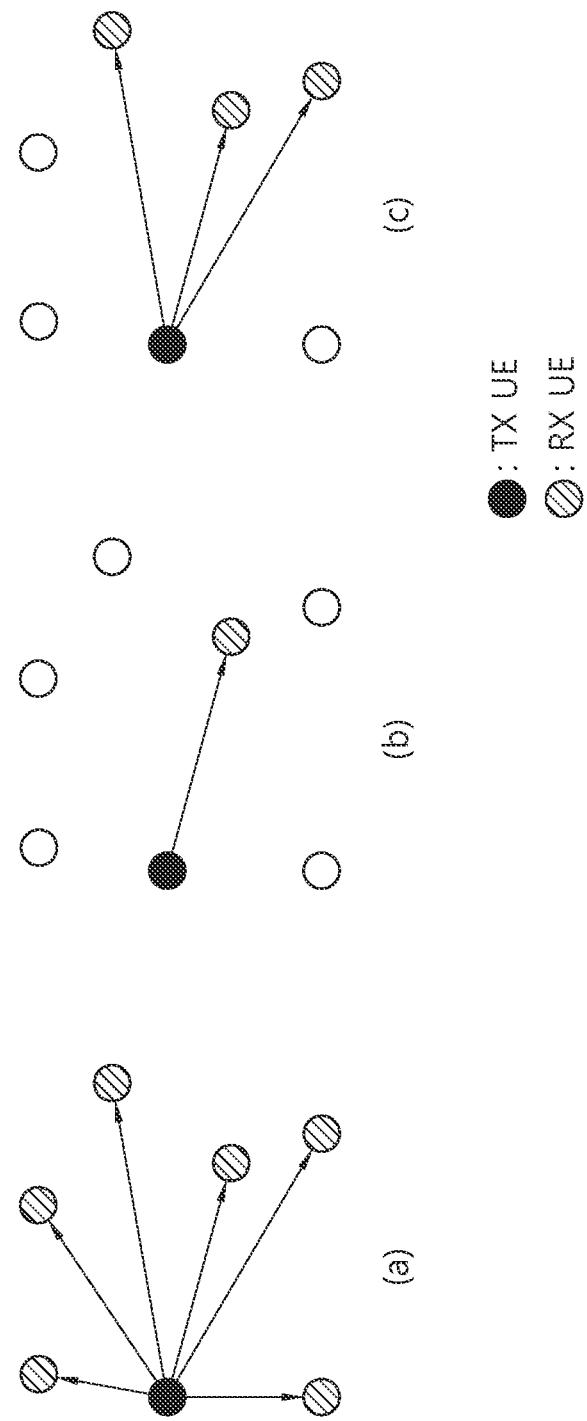
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 12:
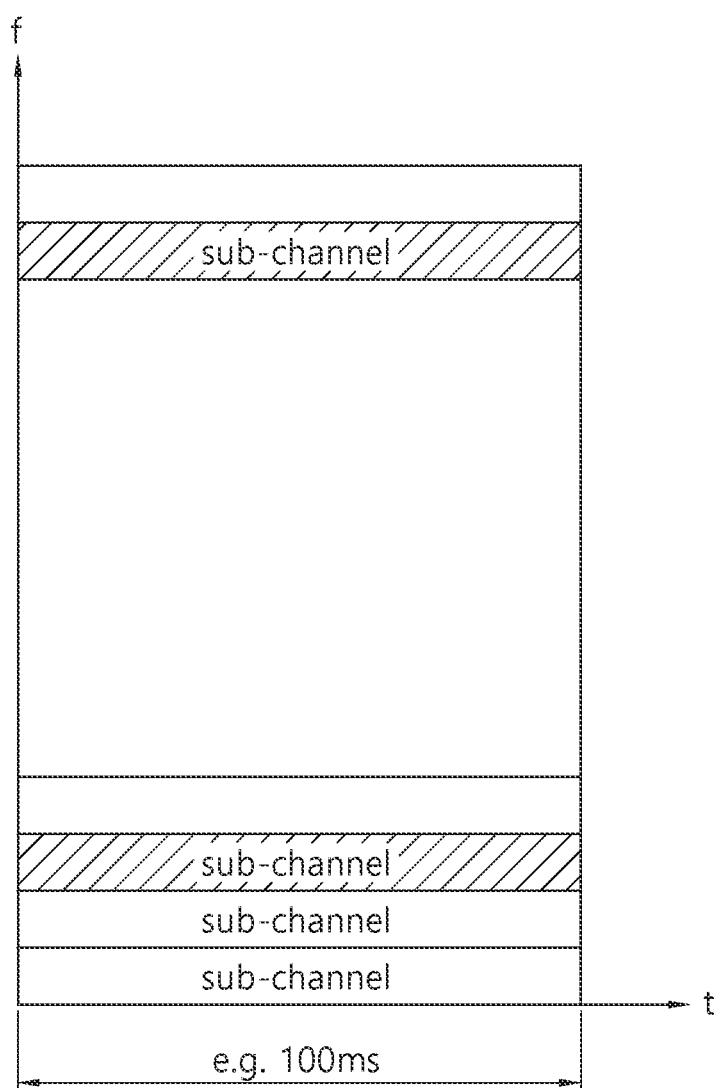
FIG. 12 shows a resource unit for CBR measurement, based on an embodiment of the present disclosure.

FIG. 12 shows a resource unit for CBR measurement, based on an embodiment of the present disclosure. The embodiment of FIG. 12 may be combined with various embodiments of the present disclosure.

Referring to FIG. 12, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 12, if it is assumed that a hatched sub-channel is a sub-channel having a value greater than or equal to a pre-configured threshold, the CBR may denote a ratio of the hatched sub-channels for a period of 100 ms. Additionally, the UE may report the CBR to the BS.

Further, congestion control considering a priority of traffic (e.g., packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (Modulation and Coding Scheme (MCS) coordination), or the like.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or RSRP.

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a sub-channel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. For example, the TX UE may be a UE which transmits SL CSI-RS(s) and/or a SL CSI report request indicator to the (target) RX UE. For example, the TX UE may be a UE which transmits (pre-defined) reference signal(s) (e.g., PSSCH demodulation reference signal (DM-RS)) and/or a SL (L1) RSRP report request indicator, to the (target) RX UE, to be used for SL (L1) RSRP measurement. For example, the TX UE may be a UE which transmits a (control) channel (e.g., PSCCH, PSSCH, etc.) and/or reference signal(s) on the (control) channel (e.g., DM-RS, CSI-RS, etc.), to be used for a SL RLM operation and/or a SL RLF operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful. For example, the RX UE may be a UE which performs SL CSI transmission to the TX UE based on SL CSI-RS(s) and/or a SL CSI report request indicator received from the TX UE. For example, the RX UE is a UE which transmits a SL (L1) RSRP measurement value, to the TX UE, measured based on (pre-defined) reference signal(s) and/or a SL (L1) RSRP report request indicator received from the TX UE. For example, the RX UE may be a UE which transmits data of the RX UE to the TX UE. For example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, the TX UE may transmit at least one of the following information to the RX UE through SCI(s). Herein, for example, the TX UE may transmit at least one of the following information to the RX UE through a first SCI and/or a second SCI.

- PSSCH (and/or PSCCH) related resource allocation information (e.g., the location/number of time/frequency resources, resource reservation information (e.g., period))
- SL CSI report request indicator or SL (L1) RSRP (and/or SL (L1) RSRQ and/or SL (L1) RSSI) report request indicator
- SL CSI transmission indicator (or SL (L1) RSRP (and/or SL (L1) RSRQ and/or SL (L1) RSSI) information transmission indicator) (on a PSSCH)
- Modulation and Coding Scheme (MCS) information
- TX power information
- L1 destination ID information and/or L1 source ID information
- SL HARQ process ID information
- New Data Indicator (NDI) information
- Redundancy Version (RV) information
- (Transmission traffic/packet related) QoS information (e.g., priority information)
- SL CSI-RS transmission indicator or information on the number of antenna ports for (transmitting) SL CSI-RS
- TX UE location information or location (or distance range) information of the target RX UE (for which SL HARQ feedback is requested)
- Reference signal (e.g., DM-RS, etc.) information related to decoding (and/or channel estimation) of data transmitted through a PSSCH. For example, information related to a pattern of (time-frequency) mapping resources of DM-RS(s), RANK information, antenna port index information, etc.

Meanwhile, in the present disclosure, for example, a PSCCH may be replaced/substituted with a SCI and/or a first SCI and/or a second SCI, or vice versa. For example, the SCI may be replaced/substituted with the PSCCH and/or the first SCI and/or the second SCI, or vice versa. For example, since the TX UE may transmit the second SCI to the RX UE through a PSSCH, the PSSCH may be replaced/substituted with the second SCI, or vice versa. For example, if SCI configuration fields are divided into two groups in consideration of a (relatively) high SCI payload size, the first SCI including a first SCI configuration field group may be referred to as a $1^{st}$ SCI or $1^{st}$-stage SCI, and the second SCI including a second SCI configuration field group may be referred to as a $2^{nd}$ SCI or $2^{nd}$-stage SCI. For example, the first SCI may be transmitted through a PSCCH. For example, the second SCI may be transmitted through a (independent) PSCCH. For example, the second SCI may be piggybacked and transmitted together with data through a PSSCH.

Meanwhile, in the present disclosure, for example, the term "configure/configured" or the term "define/defined" may refer to (pre)configuration from a base station or a network (through pre-defined signaling (e.g., SIB, MAC, RRC, etc.)) (for each resource pool). For example, "that A is configured" may mean "that the base station/network transmits information related to A to the UE".

Meanwhile, in the present disclosure, for example, an RB may be replaced/substituted with a subcarrier, or vice versa. For example, a packet or a traffic may be replaced/substituted with a transport block (TB) or a medium access control protocol data unit (MAC PDU) based on a transmission layer, or vice versa. For example, a code block group (CBG) may be replaced/substituted with a TB, or vice versa. For example, a source ID may be replaced/substituted with a destination ID, or vice versa. For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, a sub-selection window may be replaced/substituted with a selection window and/or a pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant. For example, in the CG type 1, a base station may allocate periodic resource(s) to a TX UE through an RRC message. For example, in the CG type 2, a base station may allocate periodic resource(s) to a TX UE through an RRC message, and the base station may dynamically activate or deactivate the periodic resource(s) through a DCI.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. For example, cast may be replaced/substituted with at least one of unicast, groupcast, and/or broadcast, or vice versa. For example, a cast type may be replaced/substituted with at least one of unicast, groupcast, and/or broadcast, or vice versa.

Meanwhile, in the present disclosure, a resource may be replaced/substituted with a slot or a symbol, or vice versa. For example, the resource may include a slot and/or a symbol.

Meanwhile, in the present disclosure, a priority may be replaced/substituted with at least one of logical channel prioritization (LCP), latency, reliability, minimum required communication range, prose per-packet priority (PPPP), sidelink radio bearer (SLRB), QoS profile, QoS parameter and/or requirement, or vice versa.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in the present disclosure, a Uu channel may include a UL channel and/or a DL channel. For example, the UL channel may include a PUSCH, a PUCCH, a sounding reference Signal (SRS), etc. For example, the DL channel may include a PDCCH, a PDSCH, a PSS/SSS, etc. For example, a SL channel may include a PSCCH, a PSSCH, a PSFCH, a PSBCH, a PSSS/SSSS, etc.

Meanwhile, in the present disclosure, sidelink information may include at least one of a sidelink message, a sidelink packet, a sidelink service, sidelink data, sidelink control information, and/or a sidelink transport block (TB). For example, sidelink information may be transmitted through a PSSCH and/or a PSCCH.

Meanwhile, in the present disclosure, a high priority may mean a small priority value, and a low priority may mean a large priority value. For example, Table 5 shows an example of priorities.

TABLE 5

| service or logical channel | priority value |
| --- | --- |
| service A or logical channel A | 1 |
| service B or logical channel B | 2 |
| service C or logical channel C | 3 |

Referring to Table 5, for example, service A or logical channel A related to the smallest priority value may have the highest priority. For example, service C or logical channel C related to the largest priority value may have the lowest priority.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

FIG. 13 shows a method in which a UE that has reserved transmission resource(s) informs another UE of the transmission resource(s), based on an embodiment of the present disclosure. The embodiment of FIG. 13 may be combined with various embodiments of the present disclosure.

Specifically, for example, (a) of FIG. 13 shows a method for performing by a transmitting UE chain-based resource reservation by transmitting/signaling location information of (maximum) 2 transmission resources to receiving UE(s) through one SCI, in the case of a value of K=4. For example, (b) of FIG. 13 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 11, the transmitting UE may transmit/signal only location information of the fourth transmission-related resource to the receiving UE(s) through the fourth (or last) transmission-related PSCCH. For example, referring to (a) of FIG. 11, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 11, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 11, if the transmitting UE may transmit/signal to the receiving UE(s) only location information of the fourth transmission-related resource through the fourth (or last) transmission-related PSCCH, the transmitting UE may set or designate a field/bit of location information of unused or remaining transmission resource(s) to a pre-configured value (e.g., 0). For example, in (a) and (b) of FIG. 11, if the transmitting UE may transmit/signal to the receiving UE(s) only location information of the fourth transmission-related resource through the fourth (or last) transmission-related PSCCH, the transmitting UE may be set or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 13 shows a method for performing by the transmitting UE block-based resource reservation, by signaling location information of 4 transmission resources to receiving UE(s) through one SCI, in the case of a value of K=4.

Meanwhile, for example, in the case of a millimeter-wave frequency, phase noise may increase due to impairment of RF hardware. Herein, for example, phase noise may cause common phase error (CPE) and inter carrier interference (ICI) in a frequency domain. For example, CPE may be an error common to all carrier frequencies. For example, ICI may be interference occurring between carriers due to deterioration of orthogonality between carriers.

Therefore, for example, for estimation and/or compensation of CPE, the UE may be configured to transmit phase tracking reference signal (PT-RS). For example, the UE may transmit the PT-RS through a PSSCH. For example, the UE may transmit the PT-RS through a PSSCH and/or a PSCCH. Herein, for example, if the UE performs transmission by using a (relatively) high MCS value, and/or if the UE performs transmission by using a (relatively) large bandwidth, the performance of the UE may be further improved due to the (PT-RS-based) CPE compensation.

In consideration of this, based on an embodiment of the present disclosure, the UE may be configured/defined to determine/derive whether an antenna port related to the PT-RS exists based on a (codeword-related) SCH_MCS value and/or SCH_BW value. For example, the UE may be configured/defined to determine/derive a time pattern to which the PT-RS is mapped/transmitted based on a (codeword-related) SCH_MCS value and/or SCH_BW value. For example, the UE may be configured/defined to determine/derive a frequency pattern to which the PT-RS is mapped/transmitted based on a (codeword-related) SCH_MCS value and/or SCH_BW value. For example, the UE may be configured/defined to determine/derive density to which the PT-RS is mapped/transmitted based on a (codeword-related) SCH_MCS value and/or SCH_BW value. In the present disclosure, for example, the SCH_MCS value may be a MCS value scheduled for the UE, and the SCH_BW value may be a bandwidth scheduled for the UE.

For example, the UE may determine/derive whether the antenna port related to the PT-RS exists based on the (codeword-related) SCH_MCS value and/or SCH_BW value. For example, the UE may determine/derive the time pattern to which the PT-RS is mapped/transmitted based on the (codeword-related) SCH_MCS value and/or SCH_BW value. For example, the UE may determine/derive the frequency pattern to which the PT-RS is mapped/transmitted based on the (codeword-related) SCH_MCS value and/or SCH_BW value. For example, the UE may determine/derive the density to which the PT-RS is mapped/transmitted based on the (codeword-related) SCH_MCS value and/or SCH_BW value.

For example, as the SCH_BW value is (relatively) larger, the RB unit related to PT-RS mapping in the frequency domain may be configured to be (relatively) larger. For example, as the SCH_BW value is (relatively) larger, the UE may map and transmit the PT-RS in larger RB units. For example, if SCH_BW is 8 RBs, the UE may map and transmit the PT-RS in units of 2 RBs. On the other hand, for example, if SCH_BW is 16 RBs, the UE may map and transmit the PT-RS in units of 4 RBs.

For example, as the SCH_BW value is (relatively) larger, the PT-RS may be configured to exist. For example, based on the SCH_BW value, the UE may determine whether to transmit the PT-RS. For example, if SCH_BW is less than 4 RBs, the UE may not transmit the PT-RS. On the other hand, for example, if SCH_BW is greater than or equal to 4 RBs, the UE may transmit the PT-RS.

For example, as the SCH_MCS value is (relatively) higher, the symbol unit related to PT-RS mapping in the time domain may be configured to be (relatively) smaller. For example, as the SCH_MCS value is (relatively) higher, the UE may map and transmit the PT-RS in smaller symbol units. For example, if SCH_MCS is 16 QAM, the UE may map and transmit the PT-RS in units of 4 symbols. On the other hand, for example, if SCH_MCS is 64 QAM, the UE may map and transmit the PT-RS in units of 2 symbols.

For example, as the SCH_MCS value is (relatively) higher, the PT-RS may be configured to exist. For example, based on the SCH_MCS value, the UE may determine whether to transmit the PT-RS. For example, if SCH_MCS is lower than 16 QAM, the UE may not transmit the PT-RS. On the other hand, for example, if SCH_MCS is higher than or equal to 16 QAM, the UE may transmit the PT-RS.

For example, based on whether the UE performs a chain-based resource reservation operation, a threshold value related to SCH_BW and/or a threshold value related to SCH_MCH may be differently or limitedly configured for the UE. For example, based on whether the UE performs a block-based resource reservation operation, a threshold value related to SCH_BW and/or a threshold value related to SCH_MCH may be differently or limitedly configured for the UE. For example, based on whether the UE performs a blind retransmission operation, a threshold value related to SCH_BW and/or a threshold value related to SCH_MCH may be differently or limitedly configured for the UE. For example, based on whether the UE performs a SL HARQ feedback-based retransmission operation, a threshold value related to SCH_BW and/or a threshold value related to SCH_MCH may be differently or limitedly configured for the UE. For example, based on whether the UE performs a CG-based resource selection/reservation operation, a threshold value related to SCH_BW and/or a threshold value related to SCH_MCH may be differently or limitedly configured for the UE. For example, based on whether the UE performs a DG-based resource selection/reservation operation, a threshold value related to SCH_BW and/or a threshold value related to SCH_MCH may be differently or limitedly configured for the UE.

For example, a threshold value related to SCH_BW and/or a threshold value related to SCH_MCH may be differently or limitedly configured for the UE for each resource pool. For example, a threshold value related to SCH_BW and/or a threshold value related to SCH_MCH may be differently or limitedly configured for the UE for each service type. For example, a threshold value related to SCH_BW and/or a threshold value related to SCH_MCH may be differently or limitedly configured for the UE for each service priority. For example, a threshold value related to SCH_BW and/or a threshold value related to SCH_MCH may be differently or limitedly configured for the UE for each cast type. For example, the cast type may include at least one of unicast, groupcast, and/or broadcast. For example, a threshold value related to SCH_BW and/or a threshold value related to SCH_MCH may be differently or limitedly configured for the UE for each destination UE. For example, a threshold value related to SCH_BW and/or a threshold value related to SCH_MCH may be differently or limitedly configured for the UE for each (L1 or L2) destination ID. For example, a threshold value related to SCH_BW and/or a threshold value related to SCH_MCH may be differently or limitedly configured for the UE for each (L1 or L2) source ID. For example, a threshold value related to SCH_BW and/or a threshold value related to SCH_MCH may be differently or limitedly configured for the UE for each (service) QoS parameter. For example, the (service) QoS parameter may include at least one of a reliability-related parameter, a latency-related parameter, and/or a (target) block error rate (BLER)-related parameter. For example, a threshold value related to SCH_BW and/or a threshold value related to SCH_MCH may be differently or limitedly configured for the UE for each (resource pool) congestion level. For example, a threshold value related to SCH_BW and/or a threshold value related to SCH_MCH may be differently or limitedly configured for the UE for each SL mode type. For example, the SL mode type may include SL mode 1 and/or SL mode 2. For example, a threshold value related to SCH_BW and/or a threshold value related to SCH_MCH may be differently or limitedly configured for the UE for each grant type. For example, the grant type may include CG and/or DG. For example, a threshold value related to SCH_BW and/or a threshold value related to SCH_MCH may be differently or limitedly configured for the UE for each packet/message (e.g., TB) size. For example, a threshold value related to SCH_BW and/or a threshold value related to SCH_MCH may be differently or limitedly configured for the UE for each number of subchannels used by the UE to transmit a PSSCH. For example, a threshold value related to SCH_BW and/or a threshold value related to SCH_MCH may be differently or limitedly configured for the UE for each number of subchannels used by the UE to transmit a PSCCH. For example, a threshold value related to SCH_BW and/or a threshold value related to SCH_MCH may be differently or limitedly configured for the UE for each number of RBs included in (one) subchannel. For example, a threshold value related to SCH_BW and/or a threshold value related to SCH_MCH may be differently or limitedly configured for the UE for each number of subchannels included in a resource pool and/or for each number of RBs included in a resource pool. For example, a threshold value related to SCH_BW and/or a threshold value related to SCH_MCH may be differently or limitedly configured for the UE for each numerology. For example, the numerology may include CP length and/or subcarrier spacing. For example, a threshold value related to SCH_BW and/or a threshold value related to SCH_MCH may be differently or limitedly configured for the UE for each carrier frequency and/or for each BWP frequency. For example, a threshold value related to SCH_BW and/or a threshold value related to SCH_MCH may be differently or limitedly configured for the UE for each (PSSCH-related) MCS value. For example, a threshold value related to SCH_BW and/or a threshold value related to SCH_MCH may be differently or limitedly configured for the UE, based on whether an L1 source ID exists in a SCI. For example, a threshold value related to SCH_BW and/or a threshold value related to SCH_MCH may be differently or limitedly configured for the UE, based on whether an L1 destination ID exists in a SCI. For example, a threshold value related to SCH_BW and/or a threshold value related to SCH_MCH may be differently or limitedly configured for the UE for each movement speed of the UE. For example, the movement speed of the UE may include an absolute movement speed of the UE and/or a relative movement speed of the UE.

Meanwhile, for example, in order to improve the performance/accuracy of (PT-RS-based) CPE estimation and/or compensation, it is necessary to prevent PT-RS resources from colliding (as much as possible) among different UEs. For example, the PT-RS resource may be a resource used by the TX UE to transmit the PT-RS. For example, the PT-RS resource may be a resource used by the RX UE to receive the PT-RS.

Figure 14:
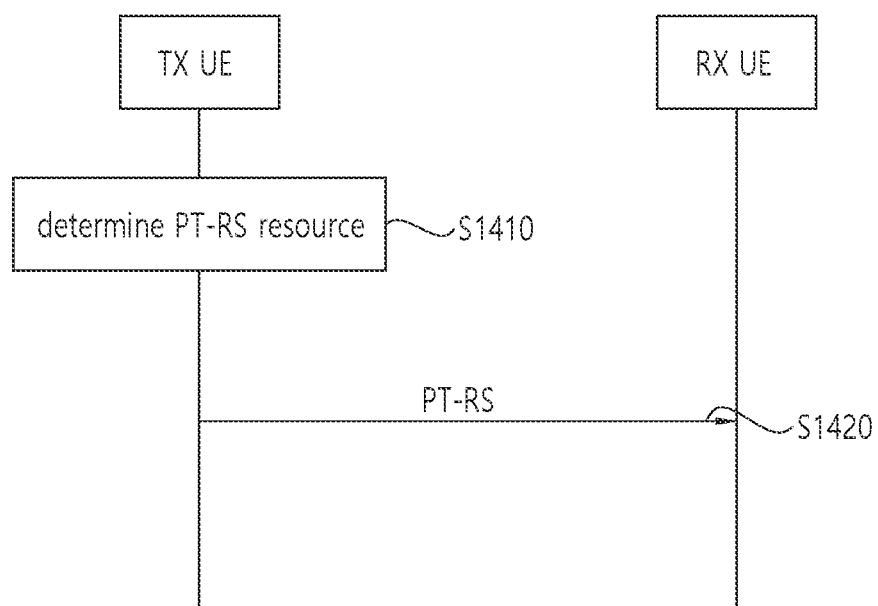
FIG. 14 shows a method for a UE to transmit the PT-RS, based on an embodiment of the present disclosure.

FIG. 14 shows a method for a UE to transmit the PT-RS, based on an embodiment of the present disclosure. The embodiment of FIG. 14 may be combined with various embodiments of the present disclosure.

Referring to FIG. 14, in step S1410, the TX UE may determine a PT-RS resource. For example, the TX UE may determine/derive a PT-RS transmission-related RB offset value (hereinafter, PT_RBOFF) and/or a PT-RS transmission-related RE offset value (hereinafter, PT_REOFF). For example, based on at least one of the rules proposed below, the TX UE may determine/derive PT_RBOFF and/or PT_REOFF.

For example, the PT_RBOFF value may be the location of a (relative) reference RB for the TX UE to map the PT-RS (on the frequency resource domain) within PSSCH and/or PSCCH-related allocated/scheduled RBs. For example, the PT_RBOFF value may be the location of a (relative) starting RB for the TX UE to map the PT-RS (on the frequency resource domain) within PSSCH and/or PSCCH-related allocated/scheduled RBs. For example, the TX UE may map the PT-RS in an RB at a location separated by the PT_RBOFF value, from the reference RB (e.g., the lowest RB) within PSSCH and/or PSCCH-related allocated/scheduled RBs.

For example, the PT_REOFF value may be the location of a (relative) reference RE for the TX UE to map the PT-RS within the RB to which the PT-RS is mapped. For example, the PT_REOFF value may be the location of a (relative) starting RE for the TX UE to map the PT-RS within the RB to which the PT-RS is mapped. For example, the TX UE may map the PT-RS to a subcarrier at a location separated by the PT_REOFF value, from a reference subcarrier (e.g., lowest subcarrier) in the RB to which the PT-RS is mapped.

For example, the PT_REOFF value may be the location of a (relative) reference RE for the TX UE to map the PT-RS (on the frequency resource domain) within PSSCH and/or PSCCH-related allocated/scheduled REs. For example, the PT_REOFF value may be the location of a (relative) starting RE for the TX UE to map the PT-RS (on the frequency resource domain) within PSSCH and/or PSCCH-related allocated/scheduled REs.

For example, the PT_RBOFF value may be a value applied based on the lowest index of PSSCH and/or a PSCCH-related RBs. For example, the PT_RBOFF value may be a value applied based on the highest index of PSSCH and/or a PSCCH-related RBs.

For example, the PT_REOFF value may be a value applied based on the lowest index of PSSCH and/or PSCCH-related REs. For example, the PT_REOFF value may be a value applied based on the highest index of PSSCH and/or PSCCH-related REs. For example, the PT_REOFF value may be a value applied based on the lowest index on the RB to which the PT-RS is mapped. For example, the PT_REOFF value may be a value applied based on the highest index on the RB to which the PT-RS is mapped.

Figure 15:
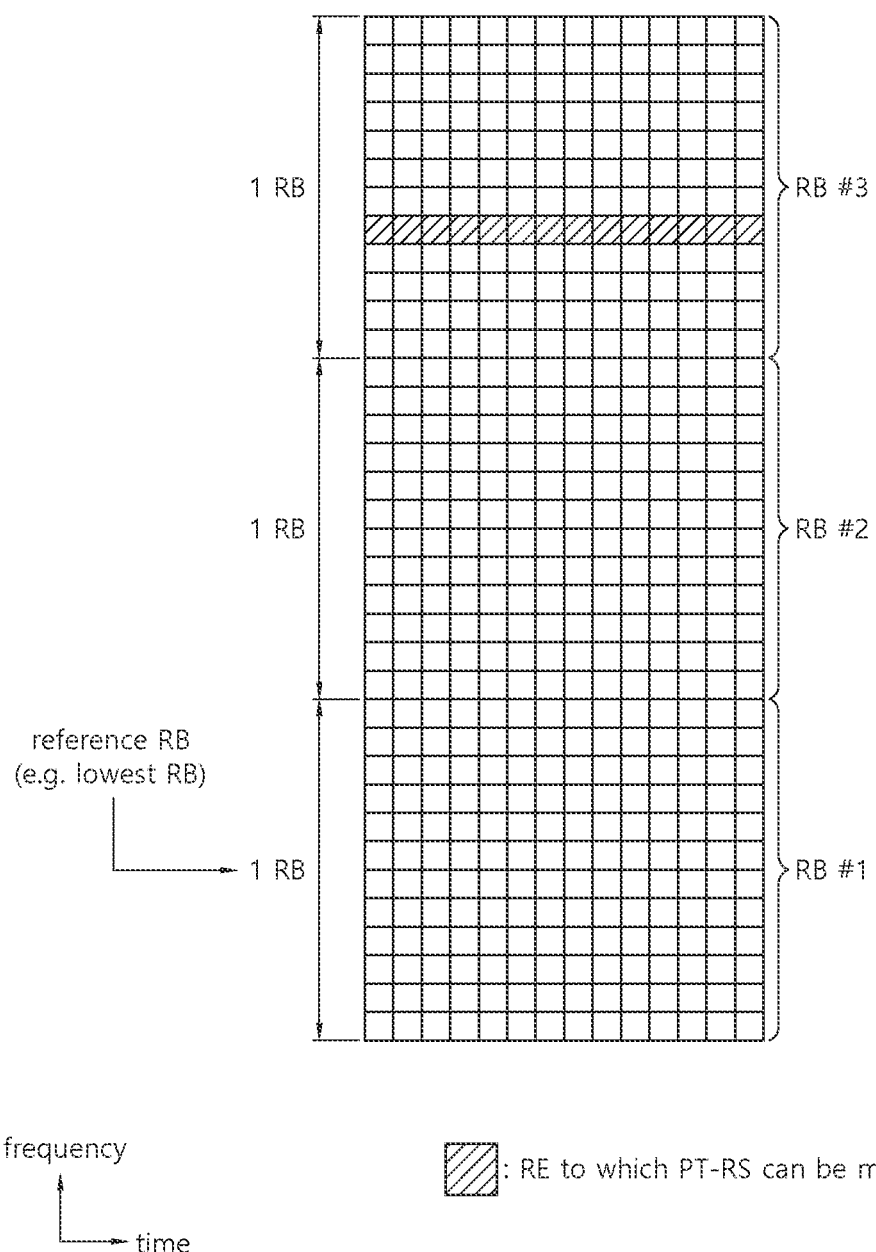
FIG. 15 shows a method for a UE to map a PT-RS, based on an embodiment of the present disclosure.

FIG. 15 shows a method for a UE to map a PT-RS, based on an embodiment of the present disclosure. The embodiment of FIG. 15 may be combined with various embodiments of the present disclosure.

Referring to FIG. 15, it is assumed that the PT_RBOFF value is 2 and the PT_REOFF value is 4. This is only an example, and the technical idea of the present disclosure is not limited to the above values. For convenience of description, the reference RB may be referred to as RB #1, and RBs subsequent to the reference RB may be referred to as RB #2 and RB #3, respectively.

Referring to FIG. 15, since the PT_RBOFF value is 2 and the PT_REOFF value is 4, the UE may map the PT-RS after 4 subcarriers from the lowest subcarrier of the RB #3. That is, the UE may be able to map the PT-RS on the 5th subcarrier in the RB #3. Specifically, the UE may map the PT-RS to at least one RE among REs located on the 5th subcarrier in the RB #3.

For example, based on whether the UE performs a chain-based resource reservation operation, the UE may determine whether to apply at least one of the rules proposed in various embodiments of the present disclosure. For example, based on whether the UE performs a block-based resource reservation operation, the UE may determine whether to apply at least one of the rules proposed in various embodiments of the present disclosure. For example, based on whether the UE performs a blind retransmission operation, the UE may determine whether to apply at least one of the rules proposed in various embodiments of the present disclosure. For example, based on whether the UE performs a SL HARQ feedback-based retransmission operation, the UE may determine whether to apply at least one of the rules proposed in various embodiments of the present disclosure. For example, based on whether the UE performs a CG-based resource selection/reservation operation, the UE may determine whether to apply at least one of the rules proposed in various embodiments of the present disclosure. For example, based on whether the UE performs a DG-based resource selection/reservation operation, the UE may determine whether to apply at least one of the rules proposed in various embodiments of the present disclosure.

For example, whether the UE applies at least one of the rules proposed in various embodiments of the present disclosure may be configured differently or limitedly for the UE for each resource pool. For example, whether the UE applies at least one of the rules proposed in various embodiments of the present disclosure may be configured differently or limitedly for the UE for each service type. For example, whether the UE applies at least one of the rules proposed in various embodiments of the present disclosure may be configured differently or limitedly for the UE for each service priority. For example, whether the UE applies at least one of the rules proposed in various embodiments of the present disclosure may be configured differently or limitedly for the UE for each cast type. For example, the cast type may include at least one of unicast, groupcast, and/or broadcast. For example, whether the UE applies at least one of the rules proposed in various embodiments of the present disclosure may be configured differently or limitedly for the UE for each destination UE. For example, whether the UE applies at least one of the rules proposed in various embodiments of the present disclosure may be configured differently or limitedly for the UE for each (L1 or L2) destination ID. For example, whether the UE applies at least one of the rules proposed in various embodiments of the present disclosure may be configured differently or limitedly for the UE for each (L1 or L2) source ID. For example, whether the UE applies at least one of the rules proposed in various embodiments of the present disclosure may be configured differently or limitedly for the UE for each (service) QoS parameter. For example, the (service) QoS parameter may include at least one of a reliability-related parameter, a latency-related parameter, and/or a (target) BLER-related parameter. For example, whether the UE applies at least one of the rules proposed in various embodiments of the present disclosure may be configured differently or limitedly for the UE for each (resource pool) congestion level. For example, whether the UE applies at least one of the rules proposed in various embodiments of the present disclosure may be con figured differently or limitedly for the UE for each SL mode type. For example, the SL mode type may include SL mode 1 and/or SL mode 2. For example, whether the UE applies at least one of the rules proposed in various embodiments of the present disclosure may be configured differently or limitedly for the UE for each grant type. For example, the grant type may include CG and/or DG. For example, whether the UE applies at least one of the rules proposed in various embodiments of the present disclosure may be configured differently or limitedly for the UE for each packet/message (e.g., TB) size. For example, whether the UE applies at least one of the rules proposed in various embodiments of the present disclosure may be configured differently or limitedly for the UE for each number of subchannels used by the UE to transmit a PSSCH. For example, whether the UE applies at least one of the rules proposed in various embodiments of the present disclosure may be configured differently or limitedly for the UE for each number of RBs used by the UE to transmit a PSCCH. For example, whether the UE applies at least one of the rules proposed in various embodiments of the present disclosure may be configured differently or limitedly for the UE for each number of RBs included in (one) subchannel. For example, whether the UE applies at least one of the rules proposed in various embodiments of the present disclosure may be configured differently or limitedly for the UE for each number of subchannels included in a resource pool and/or for each number of RBs included in a resource pool. For example, whether the UE applies at least one of the rules proposed in various embodiments of the present disclosure may be configured differently or limitedly for the UE for each numerology. For example, the numerology may include CP length and/or subcarrier spacing. For example, whether the UE applies at least one of the rules proposed in various embodiments of the present disclosure may be configured differently or limitedly for the UE for each carrier frequency and/or for each BWP frequency. For example, whether the UE applies at least one of the rules proposed in various embodiments of the present disclosure may be configured differently or limitedly for the UE for each (PSSCH-related) MCS value. For example, whether the UE applies at least one of the rules proposed in various embodiments of the present disclosure may be configured differently or limitedly for the UE, based on whether an L1 source ID exists in a SCI. For example, whether the UE applies at least one of the rules proposed in various embodiments of the present disclosure may be configured differently or limitedly for the UE, based on whether an L1 destination ID exists in a SCI. For example, whether the UE applies at least one of the rules proposed in various embodiments of the present disclosure may be configured differently or limitedly for the UE for each movement speed of the UE. For example, the movement speed of the UE may include an absolute movement speed of the UE and/or a relative movement speed of the UE.

For example, based on whether the UE performs a chain-based resource reservation operation, a parameter may be configured differently or limitedly for the UE. For example, the parameter may include at least one of PT_RBOFF, PT_REOFF, ID_CANDI, CAN_VAL, K_PTRS, and/or CON_MCS. For example, based on whether the UE performs a block-based resource reservation operation, the parameter may be configured differently or limitedly for the UE. For example, based on whether the UE performs a blind retransmission operation, the parameter may be configured differently or limitedly for the UE. For example, based on whether the UE performs a SL HARQ feedback-based retransmission operation, the parameter may be configured differently or limitedly for the UE. For example, based on whether the UE performs a CG-based resource selection/reservation operation, the parameter may be configured differently or limitedly for the UE. For example, based on whether the UE performs a DG-based resource selection/reservation operation, the parameter may be configured differently or limitedly for the UE.

For example, the parameter may be configured differently or limitedly for the UE for each resource pool. For example, the parameter may be configured differently or limitedly for the UE for each service type. For example, the parameter may be configured differently or limitedly for the UE for each service priority. For example, the parameter may be configured differently or limitedly for the UE for each cast type. For example, the cast type may include at least one of unicast, groupcast, and/or broadcast. For example, the parameter may be configured differently or limitedly for the UE for each destination UE. For example, the parameter may be configured differently or limitedly for the UE for each (L1 or L2) destination ID. For example, the parameter may be configured differently or limitedly for the UE for each (L1 or L2) source ID. For example, the parameter may be configured differently or limitedly for the UE for each (service) QoS parameter. For example, the (service) QoS parameter may include at least one of a reliability-related parameter, a latency-related parameter, and/or a (target) BLER-related parameter. For example, the parameter may be configured differently or limitedly for the UE for each (resource pool) congestion level. For example, the parameter may be configured differently or limitedly for the UE for each SL mode type. For example, the SL mode type may include SL mode 1 and/or SL mode 2. For example, the parameter may be configured differently or limitedly for the UE for each grant type. For example, the grant type may include CG and/or DG. For example, the parameter may be configured differently or limitedly for the UE for each packet/message (e.g., TB) size. For example, the parameter may be configured differently or limitedly for the UE for each number of subchannels used by the UE to transmit a PSSCH. For example, the parameter may be configured differently or limitedly for the UE for each number of RBs used by the UE to transmit a PSCCH. For example, the parameter may be configured differently or limitedly for the UE for each number of RBs included in (one) subchannel. For example, the parameter may be configured differently or limitedly for the UE for each number of subchannels included in a resource pool and/or for each number of RBs included in a resource pool. For example, the parameter may be configured differently or limitedly for the UE for each numerology. For example, the numerology may include CP length and/or subcarrier spacing. For example, the parameter may be configured differently or limitedly for the UE for each carrier frequency and/or for each BWP frequency. For example, the parameter may be configured differently or limitedly for the UE for each (PSSCH-related) MCS value. For example, the parameter may be configured differently or limitedly for the UE, based on whether an L1 source ID exists in a SCI. For example, the parameter may be configured differently or limitedly for the UE, based on whether an L1 destination ID exists in a SCI. For example, the parameter may be configured differently or limitedly for the UE for each movement speed of the UE. For example, the movement speed of the UE may include an absolute movement speed of the UE and/or a relative movement speed of the UE.

1. Proposed Rule #1

Based on an embodiment of the present disclosure, the TX UE may determine/derive the PT_RBOFF value based on a value randomly selected from among a plurality of pre-configured identifier values (i.e., ID_CANDI). For example, the TX UE may determine/derive the PT_RBOFF value based on a value randomly selected from among a plurality of pre-configured candidate values (i.e., CAN_VAL).

Herein, for example, the TX UE may determine/consider a result value obtained by taking modulo operation with a (pre-)configured RB unit value (i.e., K_PTRS) related to PT-RS mapping (in the frequency domain) with respect to (random) selected ID_CANDI and/or CAN_VAL, as the PT_RBOFF value. For example, the TX UE may determine/consider a result value obtained by taking modulo operation with K_PTRS with respect to a PSSCH and/or PSCCH-related RB index as the PT_RBOFF value. For example, the TX UE may obtain/determine the PT_RBOFF value based on Equation 1, Equation 2, or Equation 3.

$$PT\_RBOFF = (\text{selected ID\_CANDI}) \text{ MODULO } (K\_PTRS) \quad \text{[Equation 1]}$$

$$PT\_RBOFF = (\text{selected CAN\_VAL}) \text{ MODULO } (K\_PTRS) \quad \text{[Equation 2]}$$

$$PT\_RBOFF = (\text{PSSCH and/or PSCCH-related RB index}) \text{ MODULO } (K\_PTRS) \quad \text{[Equation 3]}$$

Herein, for example, "(X) MODULO (Y)" may be a function deriving a remainder value obtained by dividing X by Y. Herein, for example, the ID_CANDI value (described above) may include a plurality of pre-configured (L1 or L2) source IDs and/or (L1 or L2) destination IDs. Herein, for example, the TX UE may transmit (randomly) selected ID_CANDI and/or CAN_VAL related parameter (e.g., index, order) to the RX UE through a field (e.g., 2 bits) pre-configured in a $1^{st}$ SCI. In this case, for example, the RX UE may not perform a blind decoding operation for PT_RBOFF related to PT-RS of the TX UE.

For example, the TX UE may determine/derive the PT_RBOFF value based on at least one parameter among the parameters listed below. For example, the TX UE may determine/derive the PT_REOFF value based on at least one parameter among the parameters listed below.

1) (randomly selected) PSCCH DM-RS sequence-related (candidate) index value and/or generation/initialization identifier value For example, for each PSCCH DM-RS sequence-related (candidate) index value and/or generation/initialization identifier value, the (associated) ID_CANDI value and/or the CAN_VAL value may be pre-configured for the UE. In this case, for example, selecting by the TX UE the PSCCH DM-RS sequence-related (candidate) index value and/or generation/initialization identifier value may be selecting by the TX UE the ID_CANDI value and/or the CAN_VAL value used to determine/derive the PT_RBOFF value.

2) PSSCH and/or PSCCH-related (allocated/scheduled) transmission resource parameter For example, the PSSCH and/or PSCCH-related (allocated/scheduled) transmission resource parameter may include at least one of an RB index, a subchannel index, the number of RBs, the number of subchannels, a control channel element (CCE) index, the number of CCEs, a symbol index, the number of symbols, a slot index, and/or the number of slots. For example, the RB index may include the highest RB index or the lowest RB index. For example, the subchannel index may include the highest subchannel index or the lowest subchannel index. For example, the CCE index may include the highest CCE index or the lowest CCE index. For example, the symbol index may include a start symbol index or a last symbol index. For example, the slot index may include a start slot index or a last slot index.

3) PSSCH and/or PSCCH-related DM-RS parameter

For example, the PSSCH and/or PSCCH-related DM-RS parameter may include at least one of a sequence (generation/initialization) related seed value, a sequence (generation/initialization) related ID value, a sequence (generation/initialization) related index value, a cyclic shift index and/or an orthogonal cover code (OCC) index.

4) sidelink synch sequence (SLSS) ID 5) (L1 or L2) source ID (of the TX UE) and/or (L1 or L2) destination ID (of the RX UE) transmitted on a PSCCH (e.g., $1^{st}$ SCI)

6) PSCCH-related (some or all pre-configured) CRC bits and/or PSSCH-related (some or all pre-configured) CRC bits 7) PSSCH and/or PSCCH-related antenna port index and/or rank information 8) PSSCH and/or PSCCH-related redundancy version (RV) and/or transmission order/number For example, the PSSCH and/or PSCCH-related transmission order/number may be the transmission order/number when the TX UE (repeatedly) transmits one TB through N slots.

2. Proposed Rule #2

Based on an embodiment of the present disclosure, for example, in the case of a PSCCH (e.g., $1^{st}$ SCI), PT-RS transmission may not be configured for the UE. For example, the PT-RS may not be mapped on the PSCCH resource. For example, in the case of a PSCCH (e.g., $1^{st}$ SCI) in which a DM-RS is transmitted for every symbol (on the same subcarrier index/location), PT-RS transmission may not be configured for the UE. For example, in the case of a PSCCH in which a DM-RS is transmitted for every symbol (on the same subcarrier index/location), the TX UE may not transmit the PT-RS to the RX UE on the PSCCH. In this case, the RX UE may perform CPE estimation and/or compensation based on the DM-RS.

On the other hand, for example, in the case of a $2^{nd}$ SCI and data transmitted on a PSSCH, since a (PSSCH) DM-RS used for channel estimation does not exist for every symbol (on the time domain), PT-RS transmission may be configured for the UE. For example, the TX UE may transmit the PT-RS to the RX UE on the PSSCH.

Meanwhile, if the RX UE considers all of the plurality of (pre-configured) (candidate) PT-RS resource patterns, the RX UE may have to perform (excessive) blind decoding operation for decoding of a $2^{nd}$ SCI.

Based on an embodiment of the present disclosure, in order to prevent the RX UE from performing (excessive) blind decoding operation for the $2^{nd}$ SCI, the RX UE may determine a pattern of a PT-RS resource on a PSSCH transmitted by the TX UE, based on a pre-configured field on a PSCCH (e.g., $1^{st}$ SCI) transmitted by the TX UE. For example, the pre-configured field on the PSCCH (e.g., $1^{st}$ SCI) may include at least one of an MCS field, a DM-RS antenna port index field, and/or a DM-RS antenna port number field. For example, the TX UE may inform the RX UE of the pattern of the PT-RS transmitted on the PSSCH by using the pre-configured field on the PSCCH. In addition, for example, the RX UE may determine the pattern of the PT-RS transmitted on the PSSCH based on the pre-configured field on the PSCCH. For example, the TX UE may map the PT-RS on the PSSCH resource based on the number of DM-RS antenna ports and transmit it to the RX UE. In this case, if the RX UE receives the SCI (e.g., $1^{st}$ SCI) including information related to the number of DM-RS antenna ports from the TX UE, the RX UE may know the pattern in which the PT-RS is mapped on the PSSCH resource.

For example, if the TX UE does not transmit information related to the pattern of the PT-RS resource on the PSSCH to the RX UE through the PSCCH (e.g., $1^{st}$ SCI), for example, if the field for the corresponding purpose is not transmitted on the PSCCH (e.g., $1^{st}$ SCI), the TX UE may be configured to map the $2^{nd}$ SCI only to a (PSSCH) region to which a plurality of (pre-configured) (candidate) PT-RS resource patterns are not mapped. For example, the TX UE may map the $2^{nd}$ SCI only to the (PSSCH) region to which a plurality of (pre-configured) (candidate) PT-RS resource patterns are not mapped and may transmit it to the RX UE. For example, the $2^{nd}$ SCI may be mapped based on a pre-defined rule. For example, the $2^{nd}$ SCI may be mapped in the form of frequency first. For example, the $2^{nd}$ SCI may be preferentially mapped to the frequency domain and then mapped to the time domain.

For example, whether the PT-RS exists (on PSSCH and/or PSCCH) and/or whether the TX UE transmits the PT-RS (through PSSCH and/or PSCCH) may be configured differently based on a carrier and/or a frequency. For example, only if the TX UE performs SL communication on a carrier of the FR2 region and/or a BWP of the FR2 region, the PT-RS may exist (limitedly). For example, only if the TX UE performs SL communication on a carrier of the FR2 region and/or a BWP of the FR2 region, the TX UE may transmit the PT-RS (limitedly). In consideration of this, for example, whether the (specific) field (e.g., MCS field) required for the RX UE to identify/determine the pattern of the PT-RS resource on the PSSCH exists on the PSCCH (e.g., $1^{st}$ SCI) may be configured differently for each carrier frequency and/or for each BWP frequency. For example, whether the (specific) field (e.g., MCS field) required for the RX UE to identify/determine the pattern of the PT-RS resource on the PSSCH exists on the PSCCH (e.g., $1^{st}$ SCI) may be configured differently based on whether PT-RS transmission is configured for the TX UE. For example, whether the (specific) field (e.g., MCS field) required for the RX UE to identify/determine the pattern of the PT-RS resource on the PSSCH exists on the PSCCH (e.g., $1^{st}$ SCI) may be configured differently based on whether the PT-RS is configured for the TX UE to exist.

Specifically, for example, in the case of a BWP frequency and/or a carrier frequency of the FR2 region in which the TX UE transmits the PT-RS, a MCS field may exist on a $1^{st}$ SCI transmitted by the TX UE. On the other hand, for example, in the case of a carrier frequency and/or a BWP frequency of the FR1 region in which the TX UE does not transmit the PT-RS, a MCS field may not exist on a $1^{st}$ SCI transmitted by the TX UE. Herein, the $1^{st}$ SCI may be interpreted as a separate SCI format. Herein, for example, in the case of the carrier and/or the BWP of the FR1 region, the TX UE may transmit the MCS field on a $2^{nd}$ SCI. Herein, for example, in order to lower the decoding complexity of the RX UE for (polar coding) SCIs having different payload sizes, the TX UE may transmit by matching the payload size of the $1^{st}$ SCI not including the MCS field to the payload size of the $1^{st}$ SCI including the MCS field. For example, the TX UE may transmit by matching the payload size of the $1^{st}$ SCI transmitted on the carrier and/or the BWP of the FR1 region to the payload size of the $1^{st}$ SCI transmitted on the carrier and/or the BWP of the FR2 region.

For example, based on a selectable MCS value range and/or a selectable MCS table type and a PT-RS-related SCH_MCS threshold, PT-RS transmission of the TX UE may not be allowed. For convenience of description, the selectable MCS value range and/or the selectable MCS table type may be referred to as CON_MCS. For example, CON_MCS may be determined according to a transmission parameter restriction based on a congestion level (e.g., CBR). For example, CON_MCS may be determined according to a transmission parameter restriction based on a (absolute or relative) movement speed of the UE. For example, CON_MCS may be determined according to a transmission parameter restriction based on a synchronization reference type of the UE.

For example, if PT-RS transmission of the TX UE is not allowed based on CON_MCS and the PT-RS-related SCH_MCS threshold, the TX UE may transmit by matching the payload size of the $1^{st}$ SCI not including the MCS field to the payload size of the $1^{st}$ SCI including the MCS field. Through this, decoding complexity of the RX UE for (polar coding) SCIs having different payload sizes may be reduced.

For example, if PT-RS transmission of the TX UE is not allowed based on CON_MCS and the PT-RS-related SCH_MCS threshold, a MCS field may be considered/determined as not present on the $1^{st}$ SCI. In this case, for example, the TX UE may transmit control information to the RX UE by using a separate $1^{st}$ SCI format.

For example, in the case of the PT-RS transmitted through two antenna ports and the DM-RS transmitted through two antenna ports, a PT-RS-related antenna port with a relatively low antenna port index and a DM-RS-related antenna port with a relatively low antenna port index may be (implicitly) associated with each other, and a PT-RS-related antenna port with a relatively high antenna port index and a DM-RS-related antenna port with a relatively high antenna port index may be (implicitly) associated with each other. For example, in the case of the PT-RS transmitted through one antenna port and the DM-RS transmitted through two antenna ports, a PT-RS-related antenna port and a DM-RS-related antenna port with a relatively low antenna port index may be (implicitly) associated with each other. For example, in the case of the PT-RS transmitted through one antenna port and the DM-RS transmitted through two antenna ports, a PT-RS-related antenna port and a DM-RS-related antenna port with a relatively high antenna port index may be (implicitly) associated with each other.

For example, it may be configured such that an RE to which the PT-RS is mapped and an RE to which the $2^{nd}$ SCI is mapped are not located in the form of FDM. For convenience of description, the RE to which the PT-RS is mapped may be referred to as a PT-RS RE, and the RE to which the $2^{nd}$ SCI is mapped may be referred to as a $2^{nd}$ SCI RE. For example, the TX UE may map the PT-RS and the $2^{nd}$ SCI in the form of TDM and may transmit it. Through this, if the TX UE performs power spectral density (PSD) boosting for the PT-RS RE, it is possible to prevent a problem in which the $2^{nd}$ SCI decoding performance of the RX UE is deteriorated.

For example, it may be configured such that the PT-RS is not mapped to a $2^{nd}$ SCI symbol and/or the $2^{nd}$ SCI RE. For convenience of description, a symbol to which the $2^{nd}$ SCI is mapped may be referred to as the $2^{nd}$ SCI symbol. For example, it may be configured such that the PT-RS is mapped to the $2^{nd}$ SCI symbol and/or the $2^{nd}$ SCI RE by being punctured. For example, the TX UE may not map the PT-RS to the $2^{nd}$ SCI symbol and/or the $2^{nd}$ SCI RE. For example, the TX UE may map the PT-RS to the $2^{nd}$ SCI symbol and/or the $2^{nd}$ SCI RE by puncturing. In this case, for example, considering only the remaining (data) symbols except for the $2^{nd}$ SCI symbol, the TX UE may obtain/calculate the time domain density of the PT-RS symbol. Or, for example, considering only the remaining frequency domain/axis except for the frequency (e.g., RB) domain/axis to which the $2^{nd}$ SCI is mapped, the TX UE may obtain/calculate the frequency domain density related to the PT-RS RE.

For example, it may be configured such that the PT-RS is not mapped to a $1^{st}$ SCI symbol and/or the $1^{st}$ SCI RE. For convenience of description, a symbol to which the $1^{st}$ SCI is mapped may be referred to as the $1^{st}$ SCI symbol. For example, it may be configured such that the PT-RS is mapped to the $1^{st}$ SCI symbol and/or the $1^{st}$ SCI RE by being punctured. For example, the TX UE may not map the PT-RS to the $1^{st}$ SCI symbol and/or the $1^{st}$ SCI RE. For example, the TX UE may map the PT-RS to the $1^{st}$ SCI symbol and/or the $1^{st}$ SCI RE by puncturing. In this case, for example, considering only the remaining (data) symbols except for the $1^{st}$ SCI symbol, the TX UE may obtain/calculate the time domain density of the PT-RS symbol. Or, for example, considering only the remaining frequency domain/axis except for the frequency (e.g., RB) domain/axis to which the $1^{st}$ SCI is mapped, the TX UE may obtain/calculate the frequency domain density related to the PT-RS RE.

For example, it may be configured such that the PT-RS is punctured by $2^{nd}$ SCI mapping. In addition, for example, it is assumed that a plurality of SL CSI-RS (time/frequency) resource patterns are pre-configured (on a resource pool) and the TX UE selects one of them to perform SL CSI-RS transmission and the TX UE does not transmit information related to SL CSI-RS on a $1^{st}$ SCI (e.g., PSSCH) and the TX UE transmits information related to the SL CSI-RS through a $2^{nd}$ SCI. In this case, the TX UE may be configured to map the $2^{nd}$ SCI only to a (PSSCH) region to which a plurality of (pre-configured) (candidate) SL CSI-RS resource patterns are not mapped. For example, the TX UE may map the $2^{nd}$ SCI only to the (PSSCH) region to which a plurality of (pre-configured) (candidate) SL CSI-RS resource patterns are not mapped and may transmit it to the RX UE. Herein, for example, through this, it is possible to prevent the RX UE from performing blind decoding for the resource to which the $2^{nd}$ SCI is mapped. Herein, for example, information related to the plurality of SL CSI-RS (time/frequency) resource patterns described above may be exchanged between the TX UE and the RX UE through PC5 signaling.

For example, it may be configured such that the SL CSI-RS RE and the $2^{nd}$ SCI RE are not located in the form of FDM. For example, the TX UE may map the SL CSI-RS and the $2^{nd}$ SCI in the form of TDM and transmit it. Through this, if the TX UE performs power spectral density (PSD) boosting for the SL CSI-RS RE, it is possible to prevent a problem in which the $2^{nd}$ SCI decoding performance of the RX UE is deteriorated.

For example, it may be configured such that the SL CSI-RS is not mapped to the $2^{nd}$ SCI symbol and/or the $2^{nd}$ SCI RE. For example, it may be configured such that the SL CSI-RS is mapped to the $2^{nd}$ SCI symbol and/or the $2^{nd}$ SCI RE by being punctured. For example, the TX UE may not map the SL CSI-RS to the $2^{nd}$ SCI symbol and/or the $2^{nd}$ SCI RE. For example, the TX UE may map the SL CSI-RS to the $2^{nd}$ SCI symbol and/or the $2^{nd}$ SCI RE by puncturing.

Referring back to FIG. 14, in step S1420, the TX UE may transmit the PT-RS to the RX UE. For example, the TX UE may transmit the PT-RS to the RX UE by using the determined PT-RS resource. For example, the TX UE may transmit the SL CSI-RS to the RX UE. For example, the TX UE may transmit the SL CSI-RS to the RX UE by using the determined SL CSI-RS resource.

Additionally, for example, the TX UE may transmit the $1^{st}$ SCI to the RX UE. For example, the TX UE may transmit the $1^{st}$ SCI to the RX UE by using the PSCCH resource. Additionally, for example, the TX UE may transmit the $2^{nd}$ SCI to the RX UE. For example, the TX UE may transmit the $2^{nd}$ SCI to the RX UE by using the PSSCH resource. Additionally, for example, the TX UE may transmit the DM-RS to the RX UE. For example, the TX UE may transmit the DM-RS to the RX UE by using the determined DM-RS resource.

Based on various embodiments of the present disclosure, reference signals such as PT-RS may be transmitted without overlapping between different UEs. In addition, the $1^{st}$ SCI and the $2^{nd}$ SCI can be transmitted efficiently.

According to various embodiments of the present disclosure, if a PSSCH SL PT-RS and a PSCCH overlap in the (time/frequency) resource domain, in order to guarantee PSCCH detection performance, the TX UE may puncture a portion of the PSSCH SL PT-RS overlapped with the PSCCH. Accordingly, regardless of whether the PSSCH SL PT-RS is transmitted or not, the PSCCH detection performance required to support the service with tight requirements can be effectively ensured.

Figure 16:
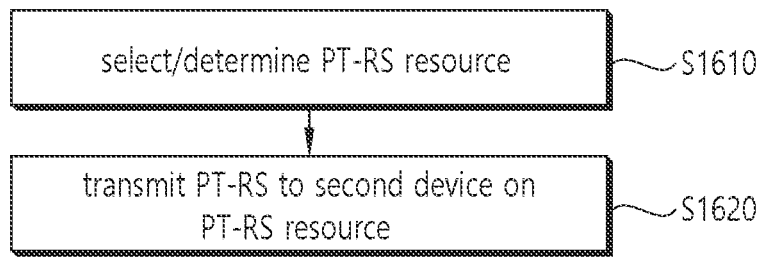
FIG. 16 shows a method for a first device to transmit a PT-RS, based on an embodiment of the present disclosure.

FIG. 16 shows a method for a first device to transmit a PT-RS, based on an embodiment of the present disclosure. The embodiment of FIG. 16 may be combined with various embodiments of the present disclosure.

Referring to FIG. 16, in step S1610, the first device may select/determine a PT-RS resource. For example, the PT-RS resource may be a resource for the first device to transmit the PT-RS. For example, the first device may select the PT-RS resource based on various embodiments of the present disclosure. For example, the first device may determine/obtain an offset value related to the PT-RS resource. For example, the first device may determine/obtain the offset value related to the PT-RS resource based on various embodiments of the present disclosure. In step S1620, the first device may transmit the PT-RS to the second device on the PT-RS resource.

Figure 17:
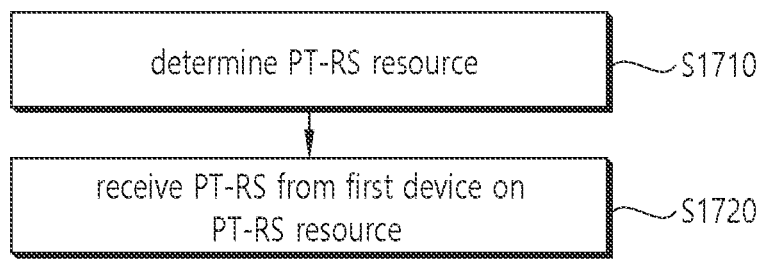
FIG. 17 shows a method for a second device to transmit a PT-RS, based on an embodiment of the present disclosure.

FIG. 17 shows a method for a second device to transmit a PT-RS, based on an embodiment of the present disclosure. The embodiment of FIG. 17 may be combined with various embodiments of the present disclosure.

Referring to FIG. 17, in step S1710, the second device may determine a PT-RS resource. For example, the PT-RS resource may be a resource for the second device to receive the PT-RS. For example, the second device may determine the PT-RS resource based on the $1^{st}$ SCI transmitted by the first device. For example, the second device may determine the PT-RS resource based on various embodiments of the present disclosure. In step S1720, the second device may receive the PT-RS from the first device on the PT-RS resource.

Meanwhile, a method for the UE to generate a sequence related to SL information, and the UE to transmit SL information to another UE based on the generated sequence, and an apparatus supporting the same are proposed.

Figure 18:
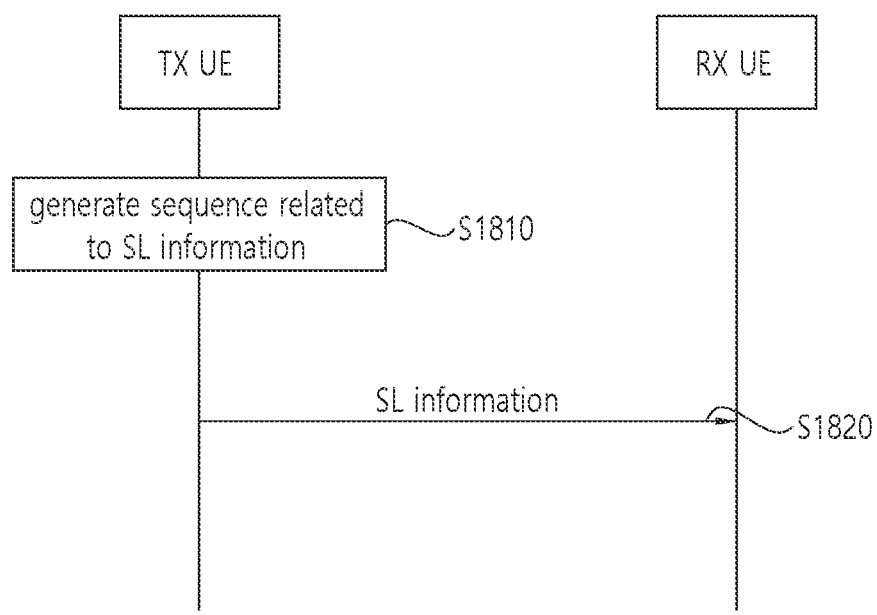
FIG. 18 shows a procedure in which a transmitting UE generates a sequence related to SL information and transmits the SL information to a receiving UE.

FIG. 18 shows a procedure in which a transmitting UE generates a sequence related to SL information and transmits the SL information to a receiving UE. The embodiment of FIG. 18 may be combined with various embodiments of the present disclosure.

Referring to FIG. 18, in step S1810, the transmitting UE may generate a sequence related to SL information. For example, the sequence related to the SL information may include a physical sidelink shared channel (PSSCH) scrambling sequence and/or a physical sidelink feedback channel (PSFCH) sequence.

In step S1820, the transmitting UE may transmit the SL information to the receiving UE based on the generated sequence.

Hereinafter, a method for the UE to generate a sequence related to SL will be described in more detail.

For example, all or part of a plurality of PSSCHs transmitted by the UE may overlap in the time resource and/or frequency resource domain. In this case, for example, the UE may generate a scrambling sequence for transmitting a PSSCH based on a physical sidelink control channel (PSCCH) cyclic redundancy check (CRC)-bits so that all or part of the plurality of PSSCHs do not overlap in the time resource and/or frequency resource domain.

In addition, the UE may transmit the second SCI to the receiving UE through a (independent) PSCCH, or may transmit the second SCI to the receiving UE by piggybacking it together with data through a PSSCH. In this case, for example, the UE may perform the scrambling operation for the second SCI separately from SL-SCH. For example, the scrambling sequence for the second SCI may be independent of parameters provided by the second SCI. On the other hand, the UE may use the parameters provided by the second SCI to generate a scrambling sequence for the SL-SCH. For example, the UE may use an L1-source ID and/or an L1-destination ID for a random seed of a scrambling sequence for the SL-SCH. However, the second SCI may not include an L1-source ID and/or an L1-destination ID according to a cast type (e.g., unicast, groupcast, broadcast) and HARQ operation. In this case, for example, the UE may use the PSCCH CRC bit again to generate a scrambling sequence for the SL-SCH. Alternatively, for example, the UE may use different portions of the PSCCH CRC bit to generate a scrambling sequence for the second SCI and a scrambling sequence for the SL-SCH.

For example, the UE may obtain an initial scrambling sequence for the PSSCH based on Equation 4 below.

$$c_{init} = n_{RNTI} \cdot 2^{15} + n_{ID} \qquad \text{[Equation 4]}$$

For example, $c_{init}$ may be an initial value of a scrambling sequence generator. For example, $n_{ID}$ may be an ID vague to be used for scrambling. For example, $n_{ID}$ may be (pre-)configured for each resource pool. For example, $n_{ID}$ may include {1008, 1025, ..., 32767} values. For example, $n_{ID}$ may be signaled through a parameter (e.g., a parameter related to scrambling) to the UE from a higher layer. For example, $n_{RNTI}$ may be a value for distinguishing a channel. For example, if the UE generates a scrambling sequence for the second SCI, the UE may determine $n_{RNTI}$ based on 16-bit least significant bit (LSB) of the PSCCH CRC. For example, if the UE generates a scrambling sequence for the SL-SCH, the UE may determine $n_{RNTI}$ based on 16-bit most significant bit (MSB) of the PSCCH CRC. That is, for example, in SL communication, the UE may obtain the scrambling sequence based on the PSCCH CRC bit rather than the radio network temporary identifier (RNTI) transmitted by the base station.

For example, considering sequence randomization between Uu link and SL and/or sequence randomization between PSFCH transmissions related to different UEs, the UE may generate a sequence for a sequence-based PSFCH format. For example, if an L1-source ID and an L1-destination ID are the same between different UEs, a collision may occur between PSFCH transmissions. Accordingly, in order to prevent collision between transmissions related to PSFCH, for example, the UE may randomize a PSFCH sequence based on the combination of the L1-source ID and the L1-destination ID. For example, if all or part of different PSCCHs/PSSCHs overlap in time domain resources and/or frequency domain resources, the UE may distinguish between different PSCCHs/PSSCHs. For example, if all or part of different PSCCHs/PSSCHs overlap in time domain resources and/or frequency domain resources, the UE may distinguish PSFCH transmissions related to different PSCCHs/PSSCHs by using different root indexes or cyclic shifts.

Based on an embodiment of the present disclosure, for example, in consideration of the possibility of collision/overlapping of PSCCH transmission resources between different transmitting UEs, the UE may apply the following (some) rules. Herein, for example, through this, interference may be randomized even if PSCCH transmission resources overlap (partially) between transmitting UEs.

For example, the UE may randomly select one of a plurality of (e.g., 4) pre-configured IDs (e.g., $N_{ID}$), and the UE may use the randomly selected ID for PSCCH DMRS sequence generation and/or PSCCH scrambling (sequence generation).

Herein, for example, the UE may use the selected ID and/or ID INDEX information as an input parameter for generating a scrambling sequence related to the second SCI (i.e., $2^{nd}$ SCI) that is piggybacked on the PSSCH and transmitted.

For example, the UE may use some bits of the PSCCH CRC (e.g., 16-bit least significant bit (LSB)) as an input parameter for generating a PSSCH and/or PSCCH scrambling sequence, and may use 16-bit (e.g., 16-bit most significant bit (MSB)) including the remaining PSCCH CRC bits as an input parameter for generating a scrambling sequence related to the second SCI.

For example, the UE may generate a PSFCH sequence based on Equation 5 below.

$$x(l \cdot N_{sc}^{RB} + n) = r_{u,v}^{(\alpha,\delta)}(n) \qquad \text{[Equation 5]}$$

For example, $r_{u,v}^{(\alpha,\zeta)}(n)$ may be a Low-PAPR sequence. For example, u may be a sequence group. For example, v may be a sequence number. For example, α may be a cyclic shift value. For example, $N_{sc}^{RB}$ may be the number of subcarriers per a resource block. For example, l and ζ may be constants. For example, l may be different according to the number of symbols allocated to PSFCH transmission. For example, if there is one symbol allocated to PSFCH transmission, the value of l may be 0. For example, if there are two symbols allocated to PSFCH transmission, the value of l may be 1. For example, ζ may be a constant. For example, ζ may be different according to the PSFCH format. For example, n may be {0, 1, ..., $N_{sc}^{RB}-1$}.

For example, the UE may configure the u and/or the v differently according to a group/sequence hopping mode. For example, the group/sequence hopping mode may be signaled from a higher layer to the UE through a parameter. For example, the group/sequence hopping mode may include Neither mode, Enabled mode, and Disabled mode. For example, if the group/sequence hopping mode is the Enabled mode, the UE may determine the u based on the following Equations 6 to 8, and may determine the v as 0.

$$u = (f_{gh} + f_{ss}) \bmod 30 \qquad \text{[Equation 6]}$$

$$f_{gh} = (\Sigma_{m=0}^{7} 2^m c(8(2n_{s,f}^\mu + n_{hop}) + m)) \bmod 30 \qquad \text{[Equation 7]}$$

$$f_{ss} = n_{ID} \bmod 30 \qquad \text{[Equation 8]}$$

For example, $n_{s,f}^\mu$ may be a slot number in a radio frame. For example, $n_{hop}$ may be a frequency hopping index. For example, $n_{ID}$ may be a hopping ID. For example, the $n_{ID}$ may be signaled to the UE from a higher layer.

For example, the UE may determine $n_{ID}$ based on an L1-source ID and an L1-destination ID. For example, the UE may concatenate X bit LSB of L1-destination ID to 10-X bit LSB of L1-source ID.

For example, the UE may determine α according to cyclic shift hopping. For example, the UE may determine α based on Equations 9 and 10 below.

$$\alpha_l = \frac{2\pi}{N_{sc}^{RB}} \left( (m_0 + m_{cs} + n_{cs}(n_{s,f}^\mu, l + l')) \bmod N_{sc}^{RB} \right) \qquad \text{[Equation 9]}$$

$$n_{cs}(n_{s,f}^\mu, l) = \Sigma_{m=0}^{7} 2^m c(8N_{symb}^{slot} n_{s,f}^\mu + 8l + m) \qquad \text{[Equation 10]}$$

For example, $n_{s,f}^\mu$ may be a slot number in a radio frame. For example, $n_{hop}$ may be a frequency hopping index. For example, $N_{sc}^{RB}$ may be the number of subcarriers per a resource block. For example, $n_{ID}$ may be signaled to the UE from a higher layer. For example, l may be an OFDM symbol number. For example, l' may be an index of an OFDM symbol. For example, $m_0$ may be an initial cyclic shift to generate a sequence.

For example, the UE may determine $m_0$ based on the PSFCH resource index. For example, the UE may implicitly determine $m_0$ based on the PSFCH resource index. For example, different PSFCH resources may have different pairs of $m_0$ and resource block indexes. That is, for example, since different pairs of $m_0$ and resource block indexes are provided, the UE may implicitly determine $m_0$ based on the PSFCH resource index.

For example, $m_{CS}$ may be a sequence cyclic shift value. For example, the $m_{CS}$ may be different according to the HARQ-ACK value as shown in Tables 6 and 7 below.

TABLE 6

| HARQ-ACK Value | 0 | 1 |
|---|---|---|
| Sequence cyclic shift | $m_{cs} = 0$ | $m_{cs} = 6$ |

TABLE 7

| HARQ-ACK Value | {0, 0} | {0, 1} | {1, 1} | {1, 0} |
|---|---|---|---|---|
| Sequence cyclic shift | $m_{cs} = 0$ | $m_{cs} = 3$ | $m_{cs} = 6$ | $m_{cs} = 9$ |

Figure 19:
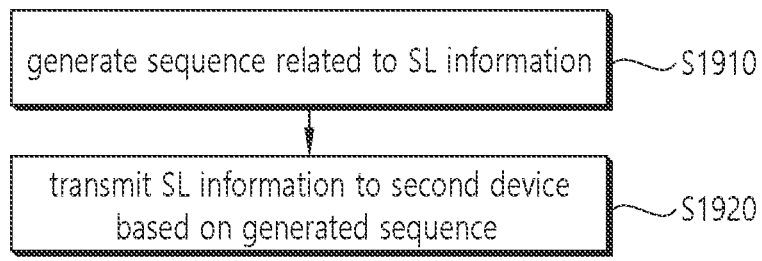
FIG. 19 shows a method in which a first device generates a sequence related to SL information and transmits the SL information to a second device based on the generated sequence, based on an embodiment of the present disclosure.

FIG. 19 shows a method in which a first device generates a sequence related to SL information and transmits the SL information to a second device based on the generated sequence, based on an embodiment of the present disclosure. The embodiment of FIG. 19 may be combined with various embodiments of the present disclosure.

Referring to FIG. 19, in step S1910, the first device may generate a sequence related to SL information. For example, the SL information may be transmitted through a PSSCH and/or a PSCCH. For example, the sequence related to the SL information may be a scrambling sequence for the PSSCH. For example, the first device may generate a sequence related to SL based on various embodiments of the present disclosure. For example, the first device may generate the sequence related to the SL information based on the PSCCH CRC bit. In step S1920, the first device may transmit the SL information to the second device based on the generated sequence.

Figure 20:
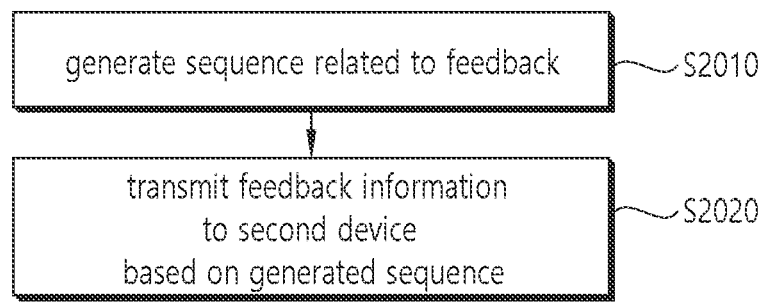
FIG. 20 shows a method in which a first device generates a sequence related to feedback and transmits feedback information to a second device based on the generated sequence, based on an embodiment of the present disclosure.

FIG. 20 shows a method in which a first device generates a sequence related to feedback and transmits feedback information to a second device based on the generated sequence, based on an embodiment of the present disclosure. The embodiment of FIG. 20 may be combined with various embodiments of the present disclosure.

Referring to FIG. 20, in step S2010, the first device may generate a sequence related to feedback. For example, the feedback may include HARQ feedback and/or feedback related to CSI. For example, the feedback information may be transmitted through a PSFCH. For example, the sequence related to the feedback may be a sequence for PSFCH. For example, the first device may generate the sequence related to the feedback based on various embodiments of the present disclosure. For example, the first device may generate the sequence related to the feedback based on an L1-source ID and an L1-destination ID. In step S2020, the first device may transmit the feedback information to the second device based on the generated sequence.

Figure 21:
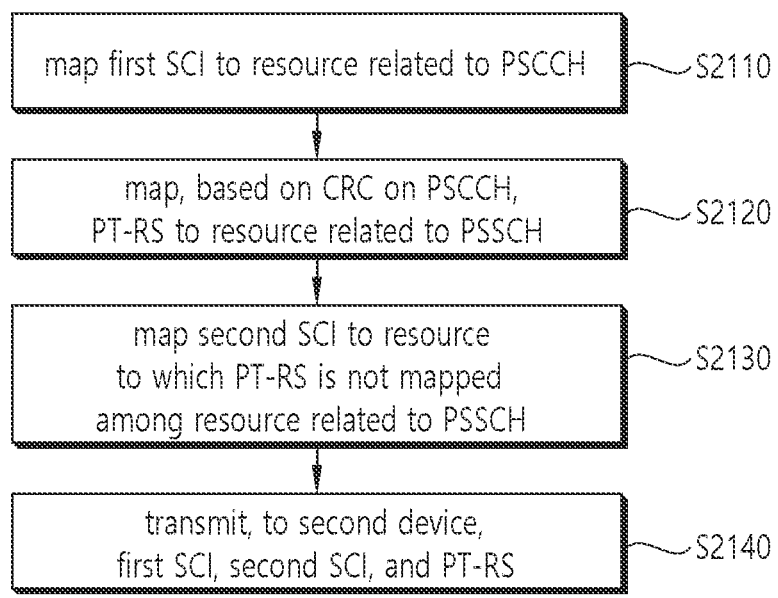
FIG. 21 shows a method for a first device to perform wireless communication, based on an embodiment of the present disclosure.

FIG. 21 shows a method for a first device to perform wireless communication, based on an embodiment of the present disclosure. The embodiment of FIG. 21 may be combined with various embodiments of the present disclosure.

Referring to FIG. 21, in step S2110, the first device may map a first sidelink control information (SCI) to a resource related to a physical sidelink control channel (PSCCH). In step S2120, the first device may map, based on a cyclic redundancy check (CRC) on the PSCCH, a phase tracking-reference signal (PT-RS) to a resource related to a physical sidelink shared channel (PSSCH). In step S2130, the first device may map a second SCI to a resource to which the PT-RS is not mapped among the resource related to the PSSCH. In step S2140, the first device may transmit, to a second device, the first SCI, the second SCI, and the PT-RS. For example, the second SCI may not be mapped to the resource to which the PT-RS is mapped.

For example, a resource block (RB) offset related to the PT-RS may be a remainder obtained by dividing the CRC on the PSCCH by an RB unit value related to PT-RS mapping, and the PT-RS may be mapped to the resource related to the PSSCH, based on the RB offset related to the PT-RS and a resource element (RE) offset related to the PT-RS. For example, the PT-RS may be mapped to a first RB after the RB offset from an RB with a smallest index among RBs related to the PSSCH. For example, the PT-RS may be mapped to a first subcarrier after the RE offset from a subcarrier with a smallest index among subcarriers in the first RB.

For example, the PT-RS may not be mapped to the resource related to the PSCCH. For example, by puncturing the PT-RS, the PT-RS may not be mapped to the resource related to the PSCCH.

For example, the second SCI may be mapped in an ascending order of a time axis index after mapping in an ascending order of a frequency axis index.

Additionally, for example, the first device may map a channel state information-reference signal (CSI-RS) to the resource related to the PSSCH, and the first device may transmit the CSI-RS to the second device. For example, the CSI-RS may not be mapped to a symbol to which the second SCI is mapped.

Additionally, for example, the first device may map a demodulation-reference signal (DM-RS) to the resource related to the PSSCH, and the first device may transmit the DM-RS to the second device. For example, the second SCI may not be mapped to the resource to which the DM-RS is mapped.

For example, a number of antenna ports related to the PT-RS may be the same as a number of antenna ports related to the DM-RS. For example, an association between an antenna port related to the PT-RS and an antenna port related to the DM-RS may be fixed.

For example, the first SCI may include information on a number of antenna ports related to a DM-RS, and the PT-RS may be mapped to the resource related to the PSSCH based on the number of antenna ports related to the DM-RS.

For example, the PT-RS may be mapped to the resource related to the PSSCH based on partial bits of the CRC on the PSCCH.

The proposed method can be applied the device(s) based on various embodiments of the present disclosure. First, the processor 102 of the first device 100 may map a first sidelink control information (SCI) to a resource related to a physical sidelink control channel (PSCCH). In addition, the processor 102 of the first device 100 may map, based on a cyclic redundancy check (CRC) on the PSCCH, a phase tracking-reference signal (PT-RS) to a resource related to a physical sidelink shared channel (PSSCH). In addition, the processor 102 of the first device 100 may map a second SCI to a resource to which the PT-RS is not mapped among the resource related to the PSSCH. In addition, the processor 102 of the first device 100 may control the transceiver 106 to transmit, to a second device, the first SCI, the second SCI, and the PT-RS. For example, the second SCI may not be mapped to the resource to which the PT-RS is mapped.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: map a first sidelink control information (SCI) to a resource related to a physical sidelink control channel (PSCCH); map, based on a cyclic redundancy check (CRC) on the PSCCH, a phase tracking-reference signal (PT-RS) to a resource related to a physical sidelink shared channel (PSSCH); map a second SCI to a resource to which the PT-RS is not mapped among the resource related to the PSSCH; and transmit, to a second device, the first SCI, the second SCI, and the PT-RS. For example, the second SCI may not be mapped to the resource to which the PT-RS is mapped.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: map a first sidelink control information (SCI) to a resource related to a physical sidelink control channel (PSCCH); map, based on a cyclic redundancy check (CRC) on the PSCCH, a phase tracking-reference signal (PT-RS) to a resource related to a physical sidelink shared channel (PSSCH); map a second SCI to a resource to which the PT-RS is not mapped among the resource related to the PSSCH; and transmit, to a second UE, the first SCI, the second SCI, and the PT-RS. For example, the second SCI may not be mapped to the resource to which the PT-RS is mapped.

Based on an embodiment of the present disclosure, a non-transitory computer-readable storage medium storing instructions may be provided. For example, the instructions, when executed, may cause a first device to: map a first sidelink control information (SCI) to a resource related to a physical sidelink control channel (PSCCH); map, based on a cyclic redundancy check (CRC) on the PSCCH, a phase tracking-reference signal (PT-RS) to a resource related to a physical sidelink shared channel (PSSCH); map a second SCI to a resource to which the PT-RS is not mapped among the resource related to the PSSCH; and transmit, to a second device, the first SCI, the second SCI, and the PT-RS. For example, the second SCI may not be mapped to the resource to which the PT-RS is mapped.

FIG. 22 shows a method for a second device to perform wireless communication, based on an embodiment of the present disclosure. The embodiment of FIG. 22 may be combined with various embodiments of the present disclosure.

Referring to FIG. 22, in step S2210, the second device may receive, from a first device, a first sidelink control information (SCI), a second SCI and a phase tracking-reference signal (PT-RS). For example, the first SCI may be mapped to a resource related to a physical sidelink control channel (PSCCH), and the PT-RS may be mapped to a resource related to a physical sidelink shared channel (PSSCH) based on a cyclic redundancy check (CRC) on the PSCCH, and the second SCI may be mapped to a resource to which the PT-RS is not mapped among the resource related to the PSSCH, and the second SCI may not be mapped to the resource to which the PT-RS is mapped.

The proposed method can be applied to the device(s) based on various embodiments of the present disclosure. First, the processor 202 of the second device 200 may control the transceiver 206 to receive, from a first device, a first sidelink control information (SCI), a second SCI and a phase tracking-reference signal (PT-RS). For example, the first SCI may be mapped to a resource related to a physical sidelink control channel (PSCCH), and the PT-RS may be mapped to a resource related to a physical sidelink shared channel (PSSCH) based on a cyclic redundancy check (CRC) on the PSCCH, and the second SCI may be mapped to a resource to which the PT-RS is not mapped among the resource related to the PSSCH, and the second SCI may not be mapped to the resource to which the PT-RS is mapped.

Based on an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a first device, a first sidelink control information (SCI), a second SCI and a phase tracking-reference signal (PT-RS). For example, the first SCI may be mapped to a resource related to a physical sidelink control channel (PSCCH), and the PT-RS may be mapped to a resource related to a physical sidelink shared channel (PSSCH) based on a cyclic redundancy check (CRC) on the PSCCH, and the second SCI may be mapped to a resource to which the PT-RS is not mapped among the resource related to the PSSCH, and the second SCI may not be mapped to the resource to which the PT-RS is mapped.

Based on an embodiment of the present disclosure, an apparatus configured to control a second user equipment (UE) performing wireless communication may be provided. For example, the apparatus may comprise: one or more processors; and one or more memories operably connected to the one or more processors and storing instructions. For example, the one or more processors may execute the instructions to: receive, from a first UE, a first sidelink control information (SCI), a second SCI and a phase tracking-reference signal (PT-RS). For example, the first SCI may be mapped to a resource related to a physical sidelink control channel (PSCCH), and the PT-RS may be mapped to a resource related to a physical sidelink shared channel (PSSCH) based on a cyclic redundancy check (CRC) on the PSCCH, and the second SCI may be mapped to a resource to which the PT-RS is not mapped among the resource related to the PSSCH, and the second SCI may not be mapped to the resource to which the PT-RS is mapped.

Based on an embodiment of the present disclosure, a non-transitory computer-readable storage medium storing instructions may be provided. For example, the instructions, when executed, may cause a second device to: receive, from a first device, a first sidelink control information (SCI), a second SCI and a phase tracking-reference signal (PT-RS). For example, the first SCI may be mapped to a resource related to a physical sidelink control channel (PSCCH), and the PT-RS may be mapped to a resource related to a physical sidelink shared channel (PSSCH) based on a cyclic redundancy check (CRC) on the PSCCH, and the second SCI may be mapped to a resource to which the PT-RS is not mapped among the resource related to the PSSCH, and the second SCI may not be mapped to the resource to which the PT-RS is mapped.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 23:
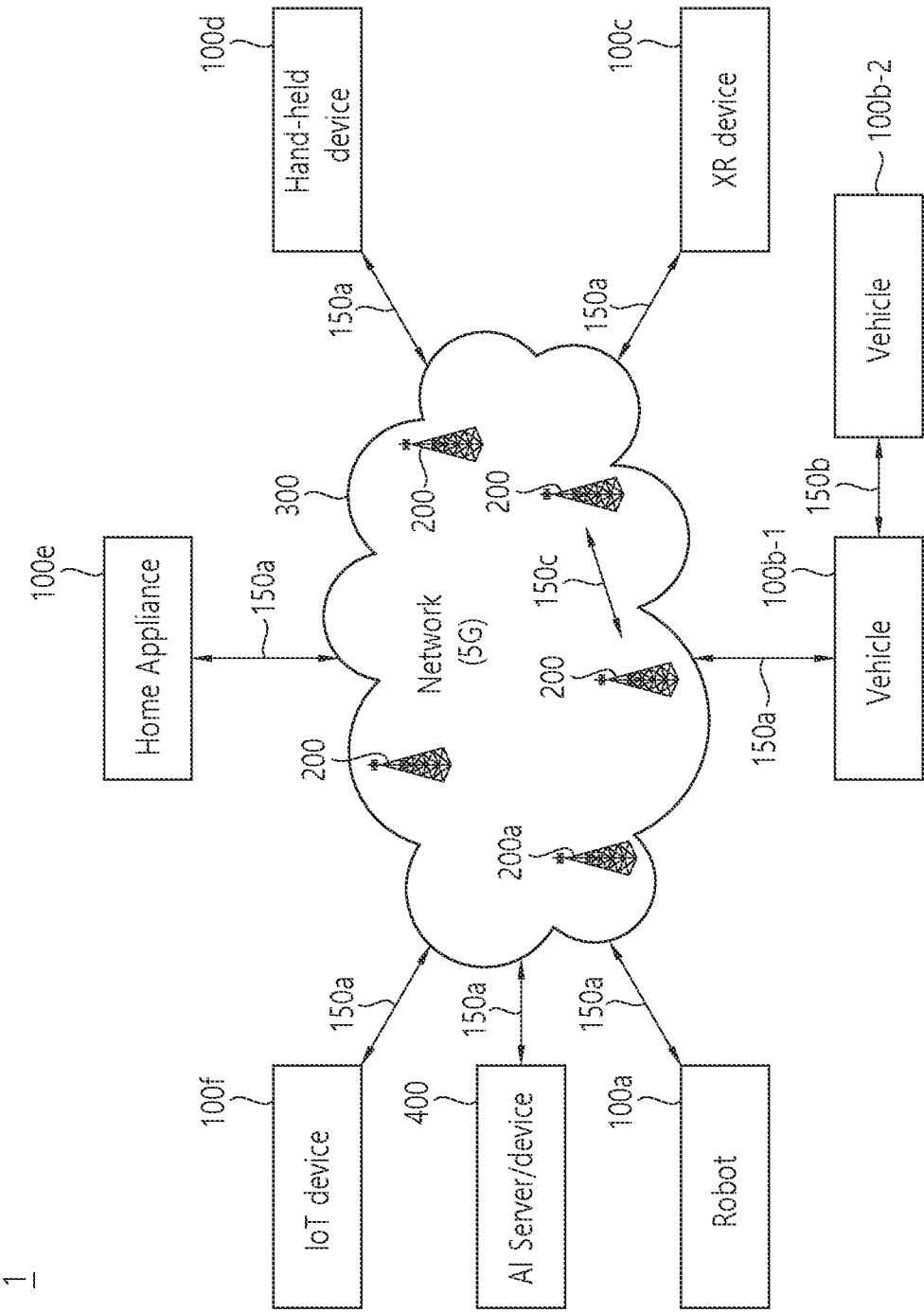
FIG. 23 shows a communication system 1, based on an embodiment of the present disclosure.

FIG. 23 shows a communication system 1, based on an embodiment of the present disclosure.

Referring to FIG. 23, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 24:
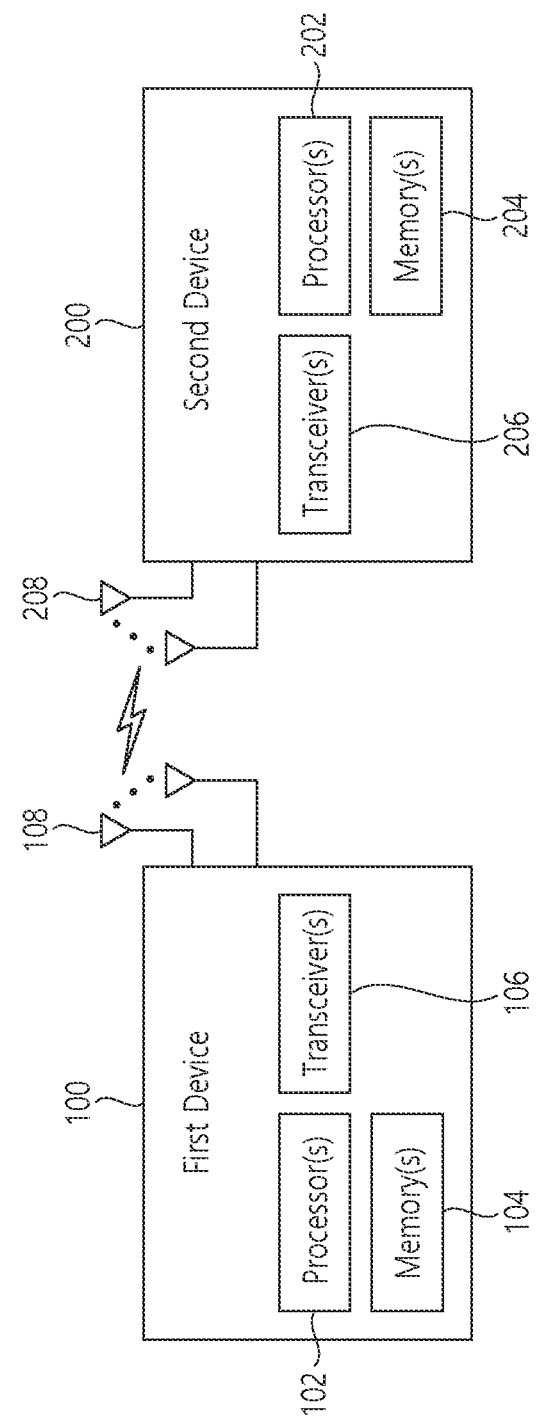
FIG. 24 shows wireless devices, based on an embodiment of the present disclosure.

FIG. 24 shows wireless devices, based on an embodiment of the present disclosure.

Referring to FIG. 24, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 23.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 25:
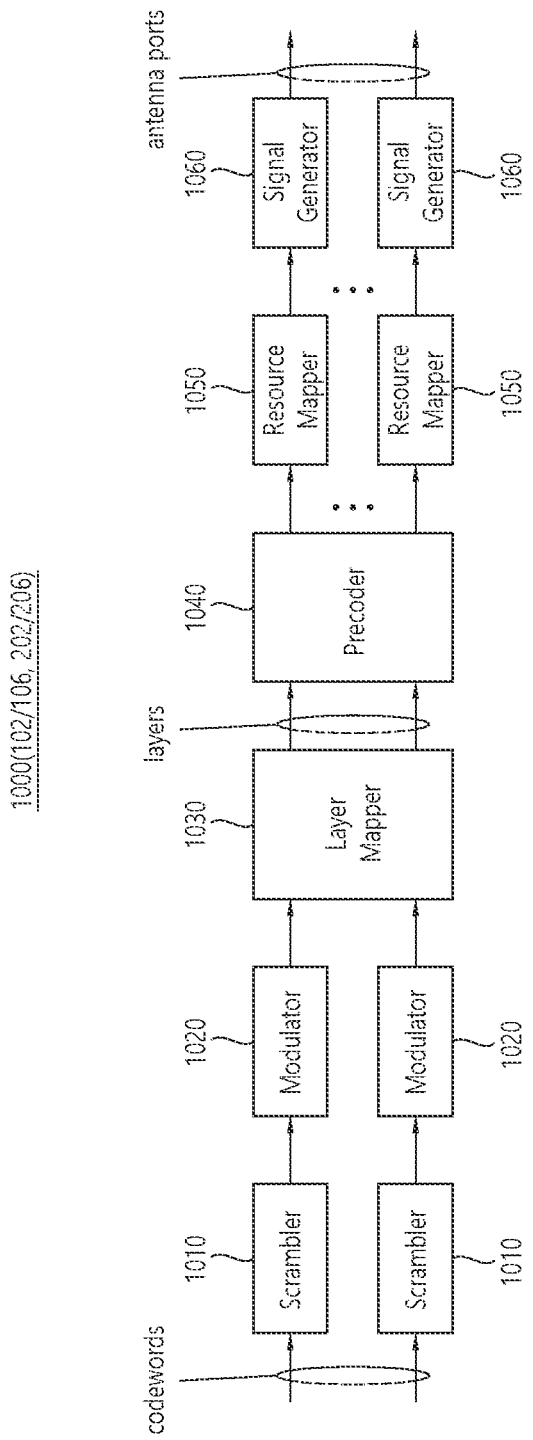
FIG. 25 shows a signal process circuit for a transmission signal, based on an embodiment of the present disclosure.

FIG. 25 shows a signal process circuit for a transmission signal, based on an embodiment of the present disclosure.

Referring to FIG. 25, a signal processing circuit 1000 may include scramblers 1010, modulators 1020, a layer mapper 1030, a precoder 1040, resource mappers 1050, and signal generators 1060. An operation/function of FIG. 25 may be performed, without being limited to, the processors 102 and 202 and/or the transceivers 106 and 206 of FIG. 24. Hardware elements of FIG. 25 may be implemented by the processors 102 and 202 and/or the transceivers 106 and 206 of FIG. 24. For example, blocks 1010 to 1060 may be implemented by the processors 102 and 202 of FIG. 24. Alternatively, the blocks 1010 to 1050 may be implemented by the processors 102 and 202 of FIG. 24 and the block 1060 may be implemented by the transceivers 106 and 206 of FIG. 24.

Codewords may be converted into radio signals via the signal processing circuit 1000 of FIG. 25. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 25. For example, the wireless devices (e.g., 100 and 200 of FIG. 24) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 26:
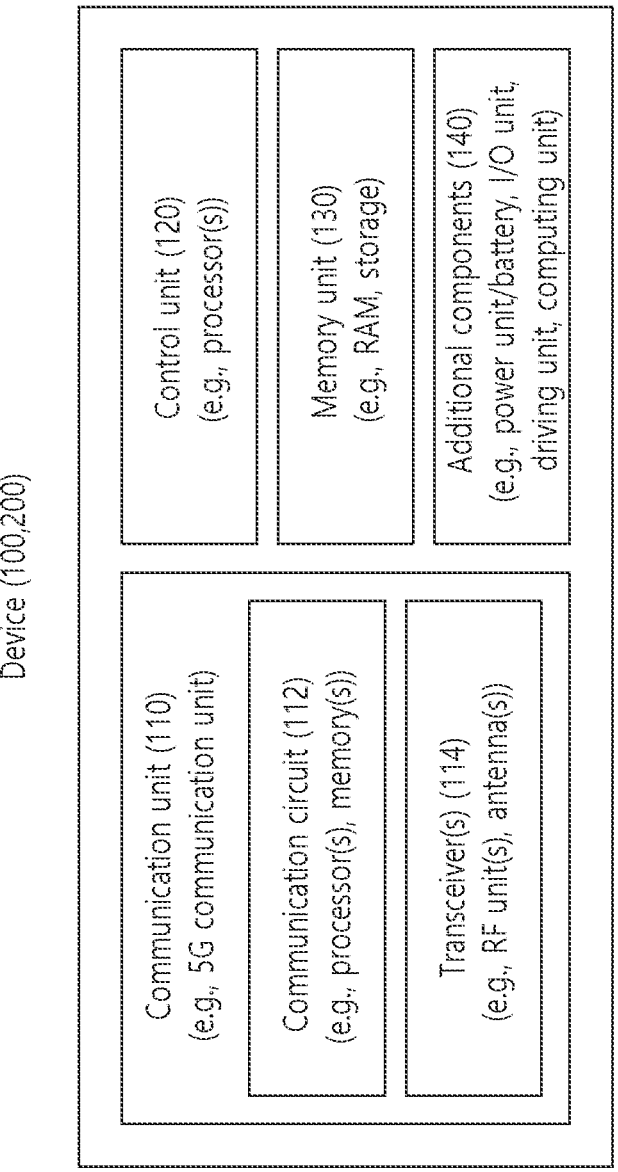
FIG. 26 shows another example of a wireless device, based on an embodiment of the present disclosure.

FIG. 26 shows another example of a wireless device, based on an embodiment of the present disclosure. The wireless device may be implemented in various forms according to a use-case/service (refer to FIG. 23).

Referring to FIG. 26, wireless devices 100 and 200 may correspond to the wireless devices 100 and 200 of FIG. 24 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 24. For example, the transceiver(s) 114 may include the one or more transceivers 106 and 206 and/or the one or more antennas 108 and 208 of FIG. 24. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 23), the vehicles (100b-1 and 100b-2 of FIG. 23), the XR device (100c of FIG. 23), the hand-held device (100d of FIG. 23), the home appliance (100e of FIG. 23), the IoT device (100f of FIG. 23), a digital broadcast terminal, a hologram device, a public safety device, an MTC device, a medicine device, a fintech device (or a finance device), a security device, a climate/environment device, the AI server/device (400 of FIG. 23), the BSs (200 of FIG. 23), a network node, etc. The wireless device may be used in a mobile or fixed place according to a use-example/service.

In FIG. 26, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 26 will be described in detail with reference to the drawings.

Figure 27:
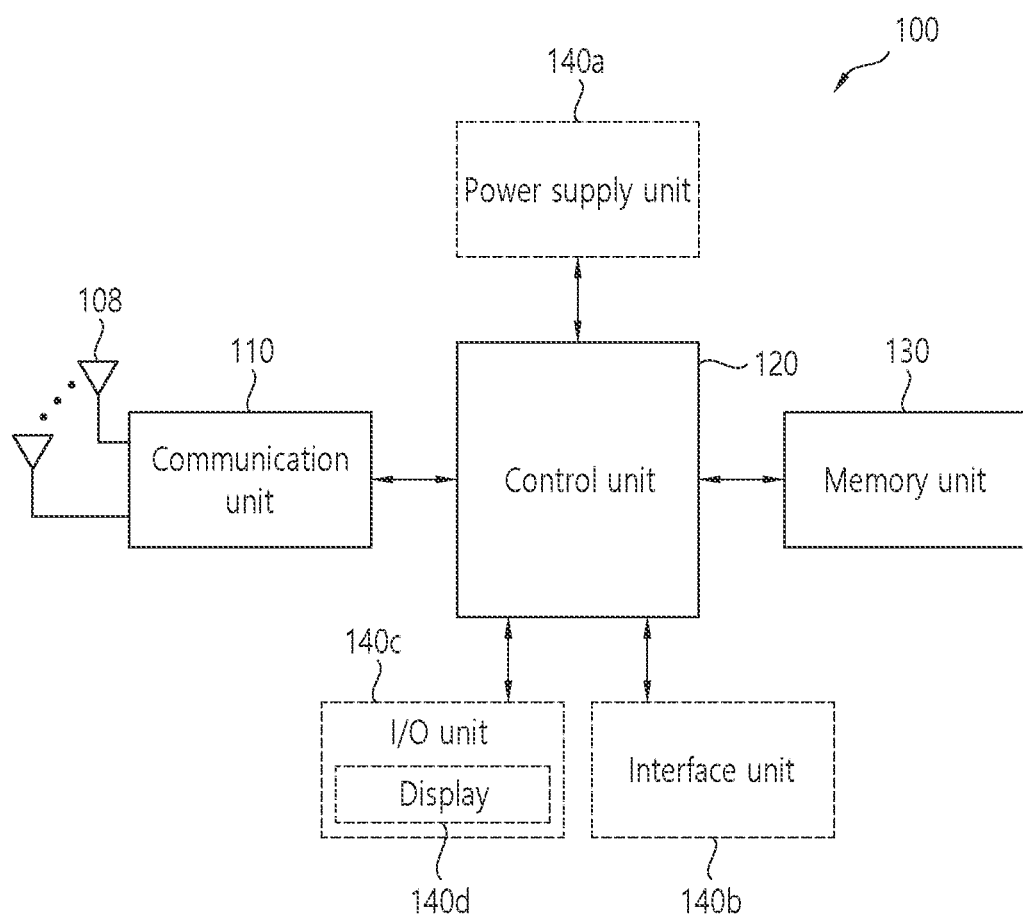
FIG. 27 shows a hand-held device, based on an embodiment of the present disclosure.

FIG. 27 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 27, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 26, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 28:
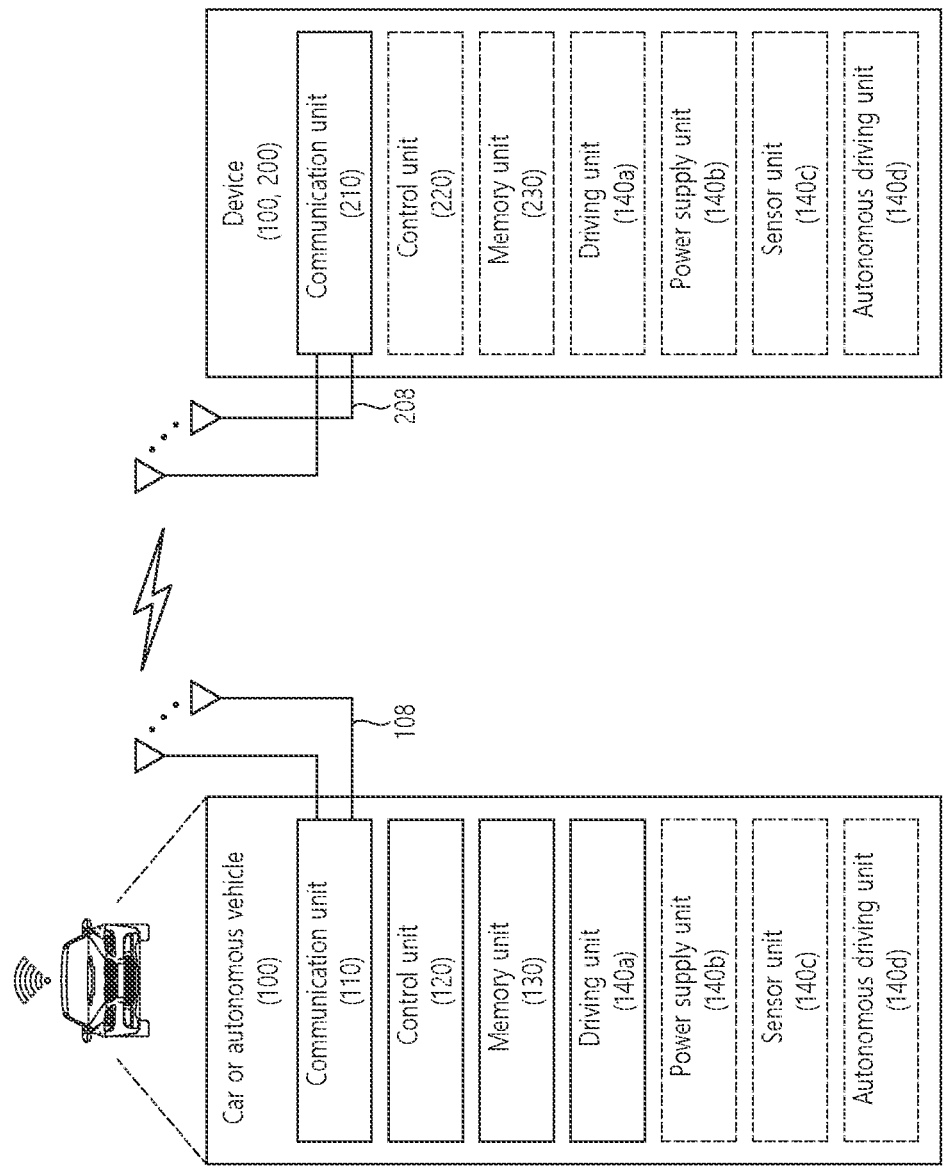
FIG. 28 shows a vehicle or an autonomous vehicle, based on an embodiment of the present disclosure.

FIG. 28 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 28, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 26, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
    mapping, by the first device, a first sidelink control information (SCI) to a resource for a physical sidelink control channel (PSCCH);
    mapping, by the first device, a phase tracking-reference signal (PT-RS) to a resource for a physical sidelink shared channel (PSSCH), based on a resource block (RB) offset and a resource element (RE) offset related to the PT-RS;
    mapping, by the first device, a second SCI to a resource not used for transmission of the PT-RS among the resource for the PSSCH; and
    transmitting, by the first device to a second device, the first SCI, the second SCI, and the PT-RS,
    wherein the RB offset is obtained as:

$k^{RB} = N_{ID} \mod K_{PT\text{-}RS}$, and wherein $k^{RB}$ is the RB offset, and $N_{ID}$ is a part of cyclic redundancy check (CRC) on the PSCCH, and $K_{PT\text{-}RS}$ is frequency density related to PT-RS mapping.

2. The method of claim 1, wherein the PT-RS is mapped to a first RB after the RB offset from an RB with a smallest index among RBs related to the PSSCH.

3. The method of claim 2, wherein the PT-RS is mapped to a first subcarrier after the RE offset from a subcarrier with a smallest index among subcarriers in the first RB.

4. The method of claim 1, wherein the PT-RS is not mapped to the resource for the PSCCH.

5. The method of claim 4, wherein, by puncturing the PT-RS, the PT-RS is not mapped to the resource for the PSCCH.

6. The method of claim 1, wherein the second SCI is mapped in an ascending order of a time axis index after mapping in an ascending order of a frequency axis index.

7. The method of claim 1, further comprising:
    mapping, by the first device, a channel state information-reference signal (CSI-RS) to the resource for the PSSCH; and
    transmitting, by the first device, the CSI-RS to the second device,
    wherein the CSI-RS and the second SCI are not mapped on a same symbol.

8. The method of claim 1, wherein a number of antenna ports related to the PT-RS is a same as a number of antenna ports related to a DM-RS.

9. The method of claim 8, wherein an association between an antenna port related to the PT-RS and an antenna port related to the DM-RS is fixed.

10. The method of claim 1, wherein the first SCI includes information on a number of antenna ports related to a DM-RS, and
    wherein the PT-RS is mapped to the resource for the PSSCH based on the number of antenna ports related to the DM-RS.

11. A first device adapted to perform wireless communication, the first device comprising:
    at least one transceiver;
    at least one processor; and
    at least one memory connected to the at least one processor and storing instructions that, based on being executed, cause the at least one processor to perform operations comprising:
        mapping a first sidelink control information (SCI) to a resource for a physical sidelink control channel (PSCCH);
        mapping a phase tracking-reference signal (PT-RS) to a resource for a physical sidelink shared channel (PSSCH), based on a resource block (RB) offset and a resource element (RE) offset related to the PT-RS;
        mapping a second SCI to a resource not used for transmission of the PT-RS among the resource for the PSSCH; and
        transmitting, to a second device, the first SCI, the second SCI, and the PT-RS,
        wherein the RB offset is obtained as:

$k^{RB} = N_{ID} \mod K_{PT\text{-}RS}$, and wherein k is the RB offset, and $N_{ID}$ is a part of cyclic redundancy check (CRC) on the PSCCH, and $K_{PT\text{-}RS}$ is frequency density related to PT-RS mapping.

12. The first device of claim 11, wherein the PT-RS is mapped to a first RB after the RB offset from an RB with a smallest index among RBs related to the PSSCH.

13. The first device of claim 12, wherein the PT-RS is mapped to a first subcarrier after the RE offset from a subcarrier with a smallest index among subcarriers in the first RB.

14. A processing device adapted to control a first device performing wireless communication, the processing device comprising:

at least one processor; and at least one memory connected to the at least one processor and storing instructions that, based on being executed, cause the at least one processor to perform operations comprising:

mapping a first sidelink control information (SCI) to a resource for a physical sidelink control channel (PSCCH);

mapping a phase tracking-reference signal (PT-RS) to a resource for a physical sidelink shared channel (PSSCH), based on a resource block (RB) offset and a resource element (RE) offset related to the PT-RS;

mapping a second SCI to a resource not used for transmission of the PT-RS among the resource for the PSSCH; and transmitting, to a second device, the first SCI, the second SCI, and the PT-RS, wherein the RB offset is obtained as:

$$k^{RB} = N_{ID} \bmod K_{PT\text{-}RS}, \text{ and}$$

wherein $k^{RB}$ is the RB offset, and $N_{ID}$ is a part of cyclic redundancy check (CRC) on the PSCCH, and $K_{PT\text{-}RS}$ is frequency density related to PT-RS mapping.

15. The processing device of claim 14, wherein the PT-RS is mapped to a first RB after the RB offset from an RB with a smallest index among RBs related to the PSSCH.

16. The processing device of claim 15, wherein the PT-RS is mapped to a first subcarrier after the RE offset from a subcarrier with a smallest index among subcarriers in the first RB.

\* \* \* \* \*